United States Patent
Shiraishi et al.

(10) Patent No.: US 7,334,573 B2
(45) Date of Patent: Feb. 26, 2008

(54) NOX EMISSION REDUCTION APPARATUS

(75) Inventors: Taisuke Shiraishi, Yokohama (JP);
Koji Hiraya, Yokohama (JP); Akihiko Kakuho, Yokohama (JP); Morihiro Nagamine, Yokosuka (JP); Daisuke Tanaka, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/684,862

(22) Filed: Mar. 12, 2007

(65) Prior Publication Data
US 2007/0215126 A1    Sep. 20, 2007

(30) Foreign Application Priority Data
Mar. 14, 2006    (JP) ............................. 2006-068920

(51) Int. Cl.
*F02B 47/08*    (2006.01)
*F02M 25/07*    (2006.01)

(52) U.S. Cl. .............................. 123/568.14; 123/568.21
(58) Field of Classification Search ........... 123/568.14, 123/568.21
See application file for complete search history.

(56) References Cited

U.S. PATENT DOCUMENTS

2003/0209234 A1    11/2003    Kinomura et al.
2005/0217649 A1*   10/2005    Shimazaki et al. .... 123/568.14
2006/0016438 A1*    1/2006    Kang .................... 123/568.14
2007/0074707 A1*    4/2007    Ogawa et al. ......... 123/568.14

FOREIGN PATENT DOCUMENTS

| EP | 1 387 074 A1 | 2/2004 |
| JP | 04 175449 A | 6/1992 |
| JP | H06-3149 B2 | 1/1994 |
| JP | 2005 325795 A | 11/2005 |

* cited by examiner

*Primary Examiner*—Erick Solis
(74) *Attorney, Agent, or Firm*—Global IP Counselors, LLP

(57) ABSTRACT

A NOx emission reduction apparatus includes high-temperature EGR gas supply means for supplying a high-temperature EGR gas into an engine cylinder, low-temperature EGR gas supply means for supplying a low-temperature EGR gas into the engine cylinder and very-low-load operation control means for, as an engine load decreases in a very-low-load range, increasing an EGR rate of the high-temperature EGR gas and decreasing an EGR rate of the low-temperature EGR gas for stable engine operations and NOx emission reduction.

20 Claims, 25 Drawing Sheets

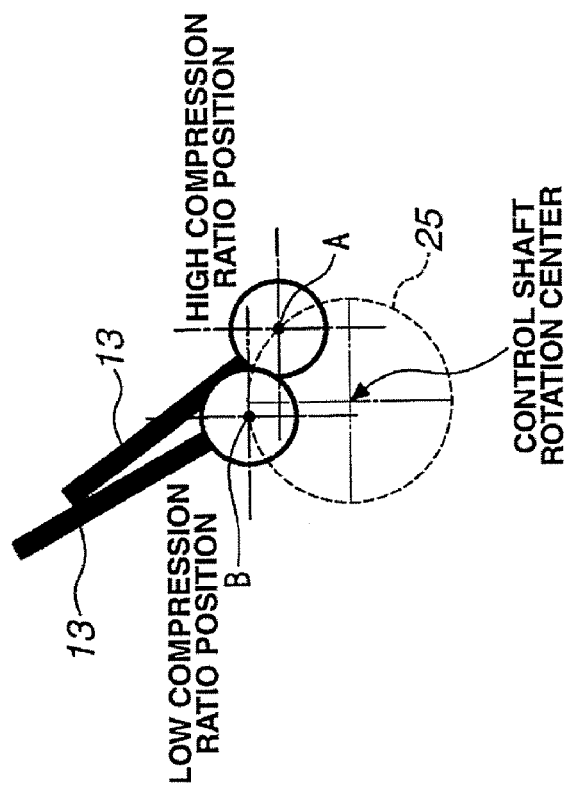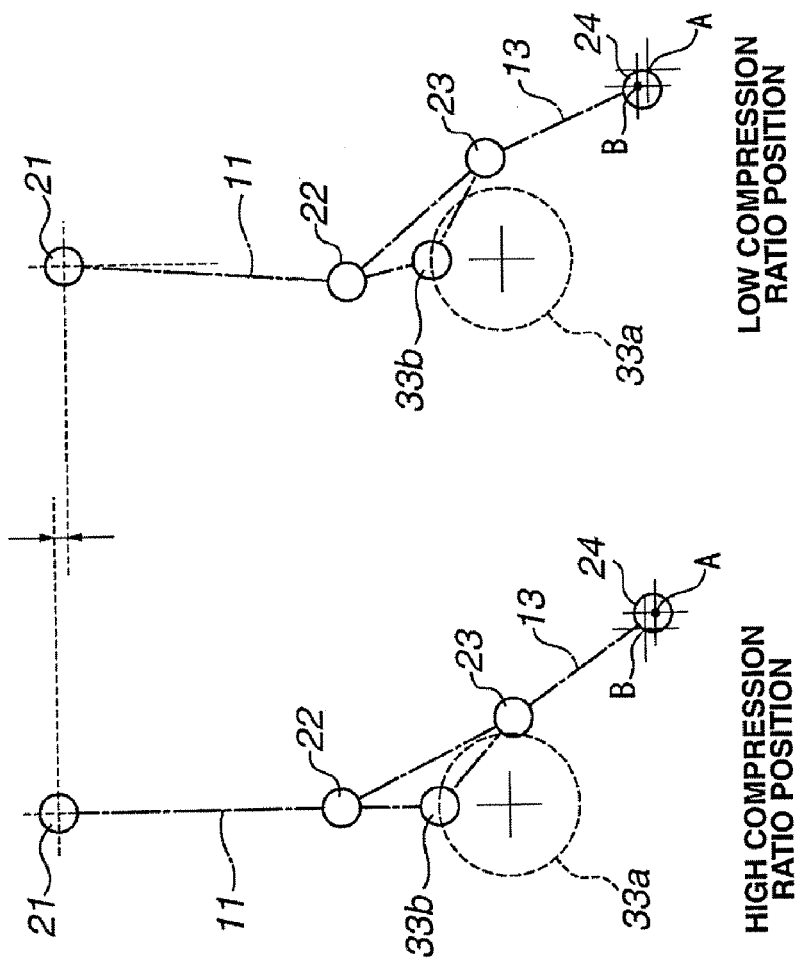

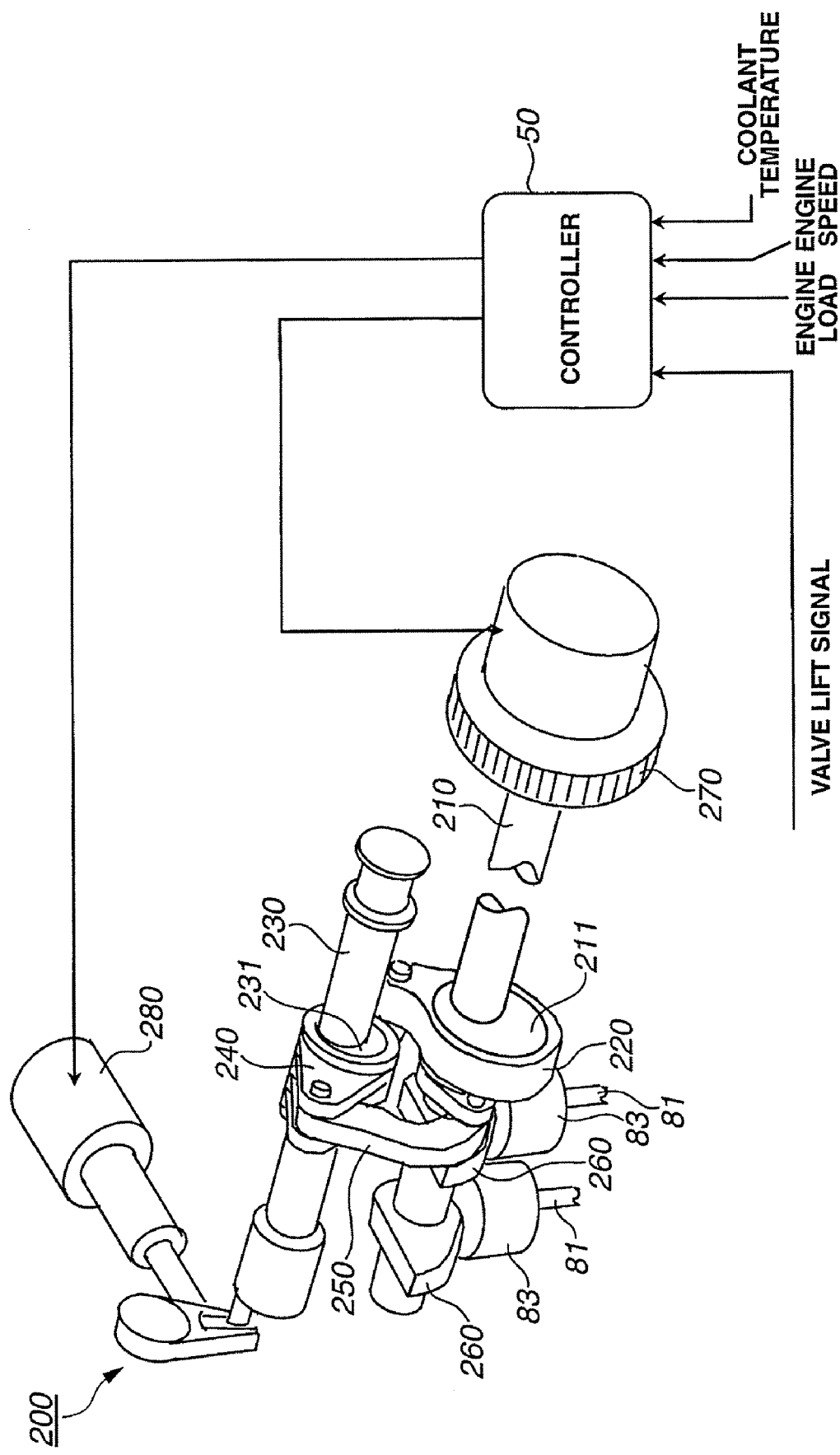

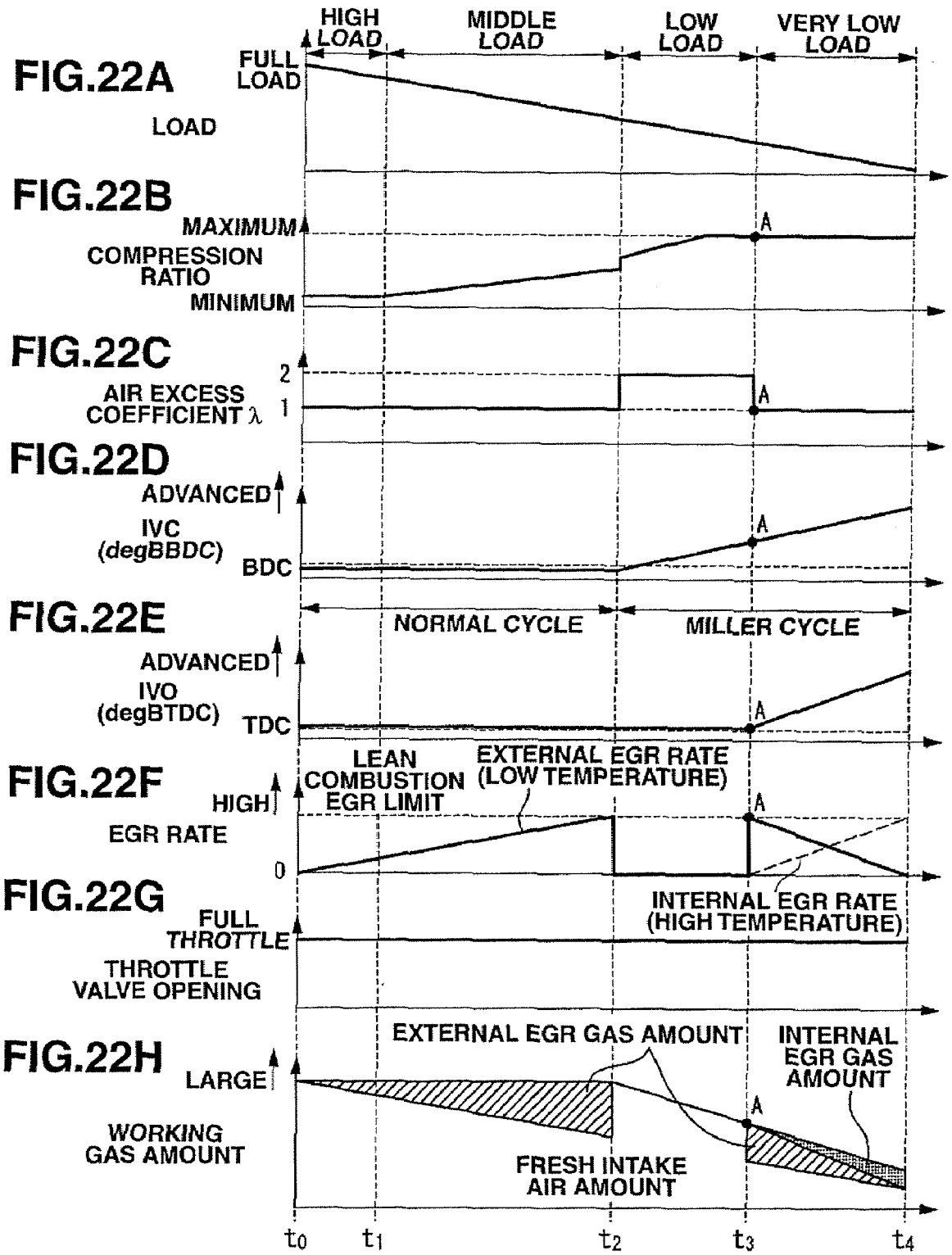

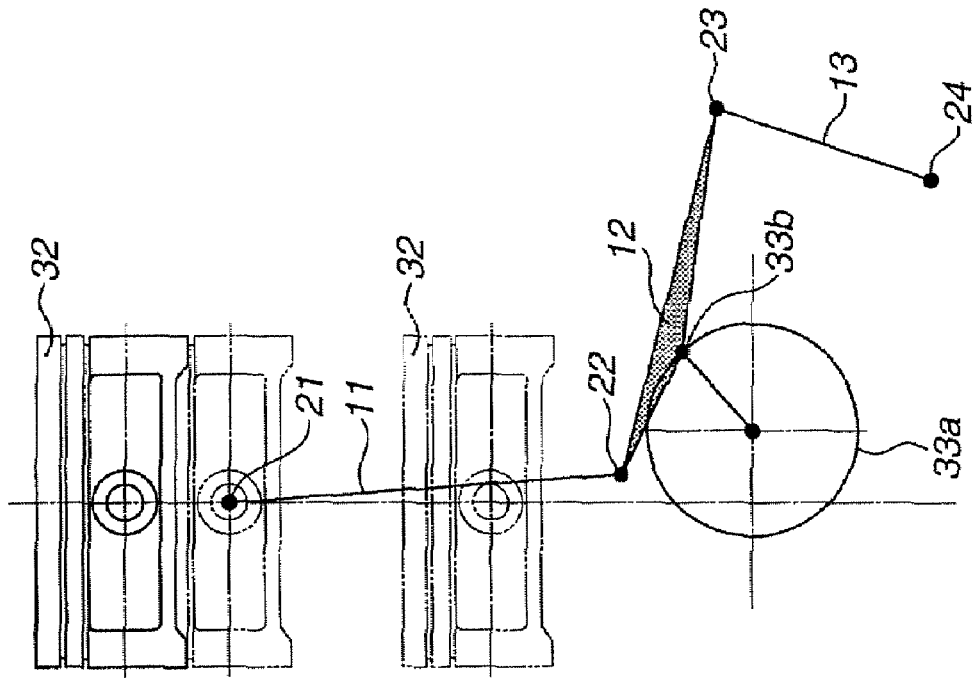
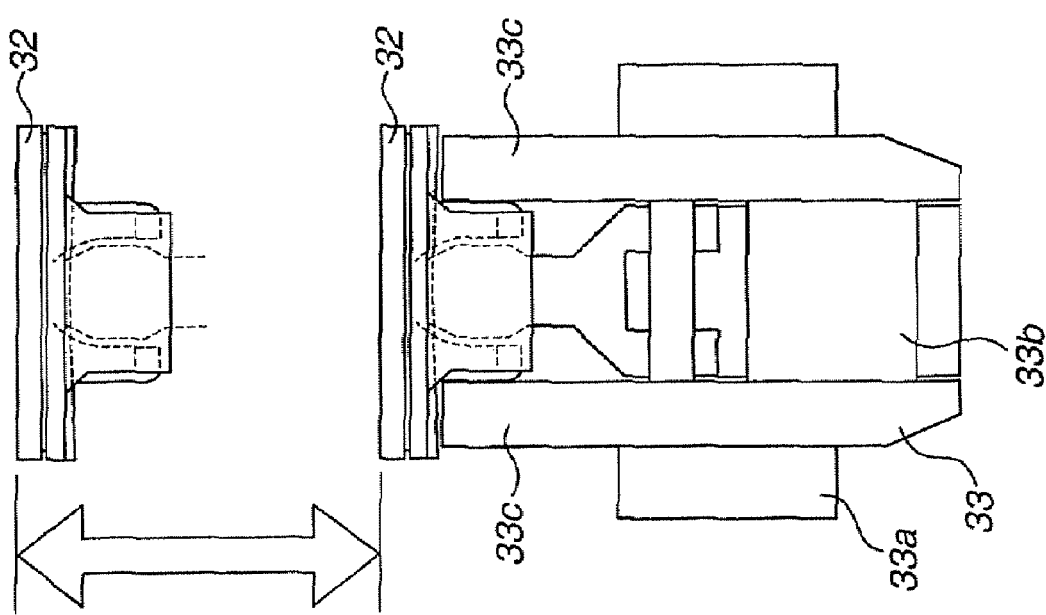

NOX EMISSION REDUCTION APPARATUS

TECHNICAL FIELD

The present invention relates to an apparatus for reducing emissions of nitrogen oxides (hereinafter referred to as "NOx") from an engine.

BACKGROUND

There is disclosed a technique for obtaining an improvement of engine fuel efficiency with an increase in engine mechanical compression ratio under lean air-fuel ratio conditions. (See Japanese Patent Publication No. 6-3149A.)

SUMMARY

The application of an EGR (exhaust gas recirculation) device to an engine is effective in reducing engine NOx emissions.

It is however likely that the combustion stability of the engine will deteriorate, especially in a very-low-load operation range, when EGR gas is used in combustion. This results in the difficulty of reducing NOx emissions without being able to supply a sufficient amount of exhaust gas recirculation (EGR) gas.

The present invention solves the above conventional problems, and it is an object of the present invention to provide a NOx emission reduction apparatus for enabling stable engine operations while securing a reduction in NOx emissions even under low-load operating conditions.

The object of the present invention can be achieved by the following means. It is herein noted that, although reference numerals are assigned below corresponding to the following embodiments of the present invention for ease of understanding, the present invention is not limited thereto.

According to one aspect of the present invention, there is provided a NOx emission reduction apparatus, comprising: high-temperature EGR gas supply means (200) for supplying a high-temperature EGR gas into an engine cylinder; low-temperature EGR gas supply means (71) for supplying a low-temperature EGR gas into the engine cylinder; and very-low-load operation control means (50, 71, 200) for, as an engine load decreases in a very-low-load range, increasing an EGR rate of the high-temperature EGR gas and decreasing an EGR rate of the low-temperature EGR gas.

It becomes possible according to the present invention to maintain a lean combustion EGR limit rate and supply a maximum amount of EGR gas for stable engine operations and NOx emission reduction even in the very-low-load range by controlling the EGR rate of the low-temperature EGR gas and the EGR rate of the high-temperature EGR gas in such a manner that the EGR rate of the low-temperature EGR gas decreases with the load and the EGR rate of the high-temperature EGR gas increases with decrease in the load.

BRIEF DESCRIPTION OF DRAWINGS

FIGS. 2A to 2C are schematic views showing how the double-link type variable compression ratio engine varies its mechanical compression ratio.

FIG. 5 is a schematic view of a variable valve mechanism for valve open and close timing control.

FIGS. 22A to 22H are time charts showing engine operations under the control of the NOx emission reduction apparatus according to the fourth embodiment of the present invention.

FIGS. 25A and 25B are diagrams showing piston behavior.

DETAILED DESCRIPTION

Hereinafter, exemplary embodiments of the present invention will be described below in detail with reference to the drawings.

First Embodiment

Figure 1:
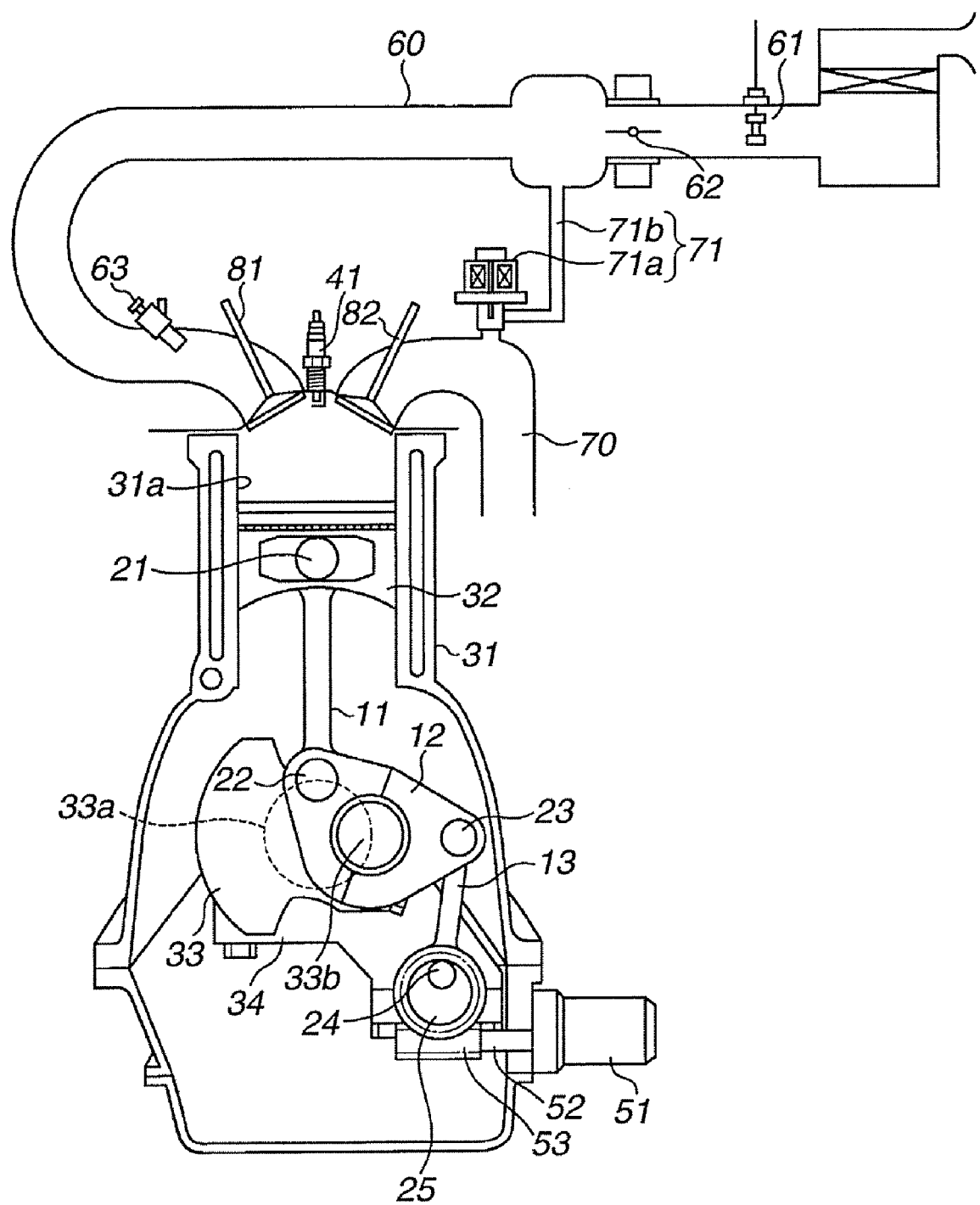
FIG. 1 is a schematic view of one example of double-link type variable compression ratio engine controllable by a NOx emission reduction apparatus according to the present invention.

FIG. 1 is a schematic view of one example of variable compression ratio engine 10 controllable by a NOx emission reduction apparatus according to the present invention. Variable compression ratio engine 10 is of double-link type in which piston-to-crankshaft connection is established by two links.

More specifically, double-link type variable compression ratio engine 10 includes two links: upper link (first link) 11 and lower link (second link) 12 for connecting piston 32 and crankshaft 33 with each other and with control link (third link) 13 for controlling lower link 12 to vary a mechanical compression ratio.

Upper link 12 has an upper end coupled to piston 32 via piston pin 21 and a lower end coupled to one end of lower link 12 via connection pin 22. Piston 32 makes a reciprocating movement within cylinder 31a of cylinder block 31 in response to a combustion pressure.

Lower link 12 has one end coupled to upper link 11 via connection pin 22 and the other end coupled to control link 13 via connection pin 23. A connection hole is formed nearly in the center of lower link 12, and crank pin 33b of crankshaft 33 is engaged in the connection hole in such a manner that lower link 12 can rotate around crank pin 33b. In the present embodiment, lower link 12 consists of two right and left separable members. Crankshaft 33 has a plurality of journals 33a and crank pin 33b. Journals 33a are rotatably supported on cylinder block 31 and ladder frame 34. The center of crank pin 33b is displaced by a given amount from the centers of journals 33a, and lower link 12 is pivotally engaged to crank pin 33b.

Control link 13 has one end coupled to lower link 12 via connection pin 23 and the other end coupled to control shaft 25 via connection pin 24 in such a manner that control link 13 can pivot about connection pin 24. Control shaft 25 has gear teeth in mesh with pinion 53 on rotation shaft 52 of actuator 51 so that control shaft 25 can be rotated by actuator 51 to cause a movement of connection pin 24.

In intake passage 60 of engine 10, there are provided airflow sensor 61 to detect a fresh intake air amount, throttle valve 62 to adjust the fresh intake air amount in accordance with its valve opening and fuel injection valve 63 to inject fuel.

In exhaust passage 70 of engine 10, there is provided EGR device 71 to recirculate as EGR gas a part of exhaust gas flowing through exhaust passage 70 into intake passage 60. EGR device 71 has EGR valve 71a to adjust the EGR gas amount in accordance with its valve opening and EGR passage 71b to establish communication between intake passage 60 and exhaust passage 70. Herein, EGR gas recirculated from exhaust passage 70 to intake passage 60 through EGR device 71 and supplied to cylinder 31a is referred to as "external EGR gas". The external EGR gas may also be called "low-temperature EGR gas" because it is cooled while flowing through EGR device 71. By contrast, EGR gas returned to an intake port (and which under some embodiments may at least partially enter the intake passage 61) and then resupplied to cylinder 31a under control of the valve open timing control of intake valve 81 (as described later) is referred to as "internal EGR gas". The internal EGR gas is higher in temperature than the external EGR gas and thus may also be referred to as "high-temperature EGR gas".

Controller 50 controls actuator 51 to rotate control shaft 25 and thereby vary the engine mechanical compression ratio. Controller 50 also controls fuel injection of fuel injection valve 63 arranged in the intake port and an ignition timing of spark plug 41 arranged in the cylinder head. As will be described later, valve open and close timings IVO and IVC of intake valve 81 can be adjusted by means of variable valve mechanism 200, and controller 50 further controls variable valve mechanism 200 to adjust the valve open timing IVO of intake valve 81 in such a manner as to regulate the EGR gas amount and to adjust the valve close timing IVC of intake valve 81 in such a manner as to regulate the fresh intake gas amount. Namely, controller 50 determines the load of engine 10 and performs various controls depending on the engine load. In the present embodiment, controller 50 consists of a microcomputer including a central processing unit (CPU), a read-only memory (ROM), a random-access memory (RAM) and an input/output interface (I/O interface). Controller 50 may be formed of a plurality of microcomputers. Controller 50 contains a number of interactive program modules (i.e., software programs) that accomplish the methods steps described below. Any reference to a method step made herein is also a reference to a respective program module that accomplishes that method step.

FIGS. 2A, 2B and 2C are schematic views showing how to vary the mechanical compression ratio of double-link type variable compression ratio engine 10.

The mechanical compression ratio of double-link type variable compression ratio engine 10 can be varied by changing the position of connection pin 24 upon rotation of control shaft 25. For example, the top dead center (TDC) of piston 32 rises to provide a larger mechanical compression ratio when connection pin 24 is brought to a position A as shown in FIGS. 2A and 2B.

When connection pin 24 is bought to a position B as shown in FIGS. 2B and 2C, control link 13 is pushed upward to move connection pin 23 upward, cause lower link 12 to swing about crank pin 33b in a counterclockwise direction and move connection pin 22 downward. Then, the top dead center (TDC) of piston 32 falls to provide a smaller mechanical compression ratio.

As compared to an ordinary engine of constant mechanical compression ratio (hereinafter just referred to as "ordinary engine"), double-link type variable compression ratio engine 10 has the characteristics that the period of time during which piston 32 remains at around the top dead center is relatively long. Because of such engine characteristics, double-link type variable compression ratio engine 10 is capable of providing a larger amount of combustion energy than that of the ordinary engine and securing combustion stability even during ultra-lean combustion.

Figure 3A:
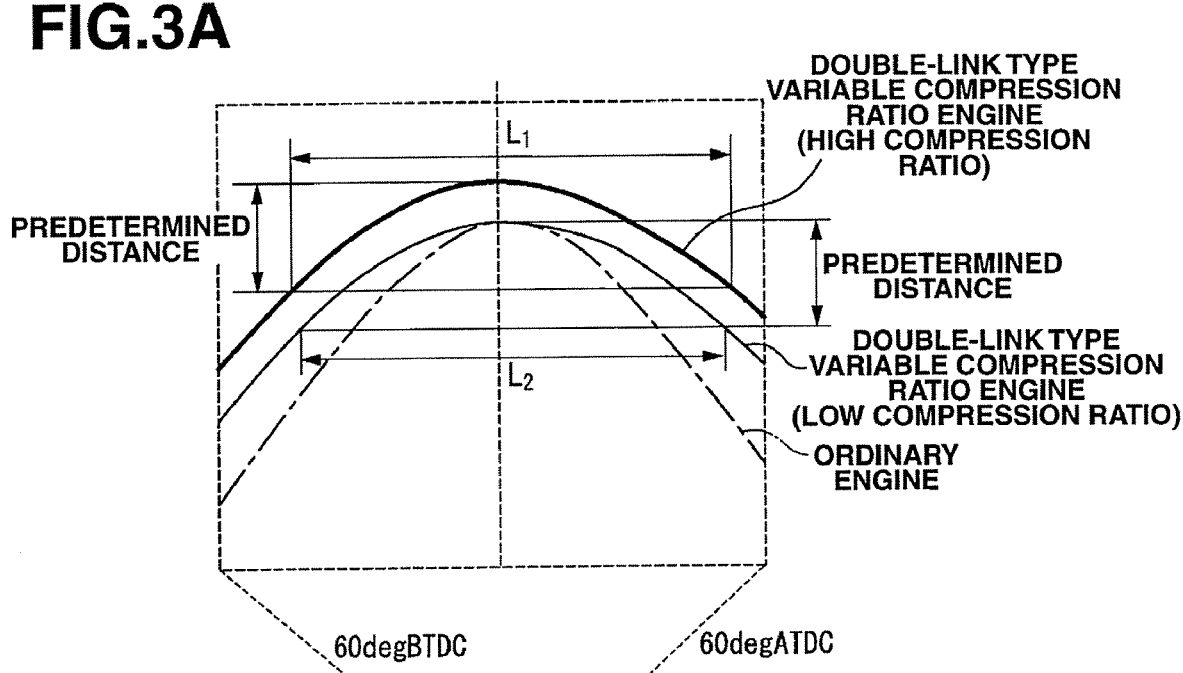
FIGS. 3A and 3B are diagrams showing piston behavior of the double-link type variable compression ratio engine.
Figure 3B:
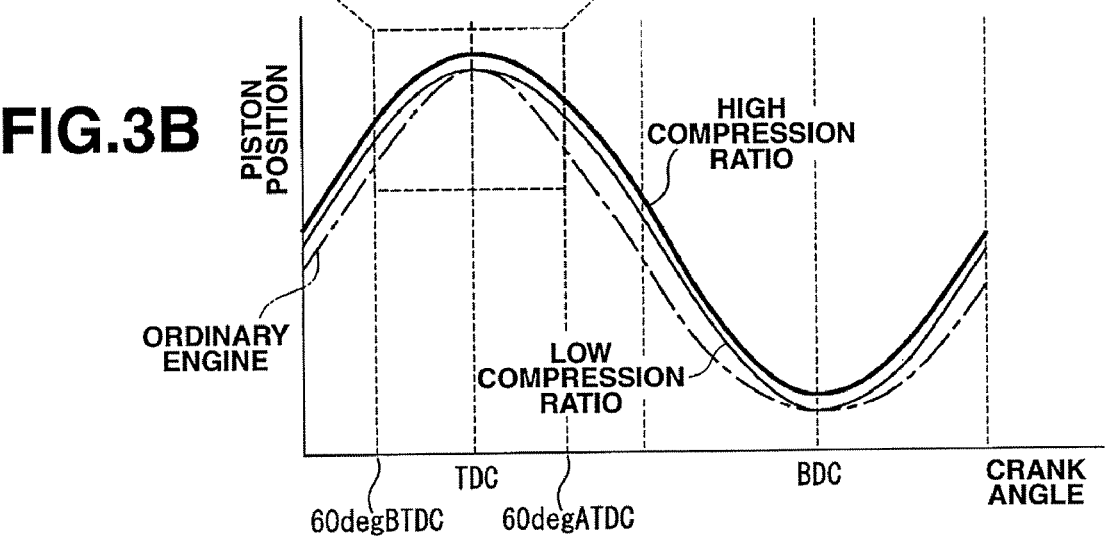

FIGS. 3A and 3B are diagrams showing the behavior of piston 32 of double-link type variable compression ratio engine 10. It is noted that FIG. 3A is an enlarged view of a dotted-line area of FIG. 3B. In FIGS. 3A and 3B, the behavior of piston 32, when the compression ratio of double-link type variable compression ratio engine 10 is controlled to the same value as that of the ordinary engine, is indicated by a thin broken line.

The period of time during which piston 32 stays within a predetermined distance from the top dead center is herein defined as "piston top dead center duration". As is clearly shown in FIGS. 3A and 3B, double-link type variable compression ratio engine 10 has a longer piston top dead center duration than that of the ordinary engine when the compression ratio of variable compression ratio engine 10 and the compression ratio of the ordinary engine are maintained at the same degree.

The piston top dead center duration of variable compression ratio engine 10 takes a larger value L1 in a high-compression-ratio state than a value L2 in a low-compression-ratio state (i.e., L1>L2 in FIG. 3B).

In short, the piston top dead center duration of variable compression ratio engine 10 is longer than that of the ordinary engine and increases with the compression ratio. Such a long piston top dead center duration means that the high-compression-state is maintained for a long time during combustion. This makes it possible for engine 10 to provide relatively large combustion energy and secure combustion stability even during ultra-lean combustion.

Figure 4A:
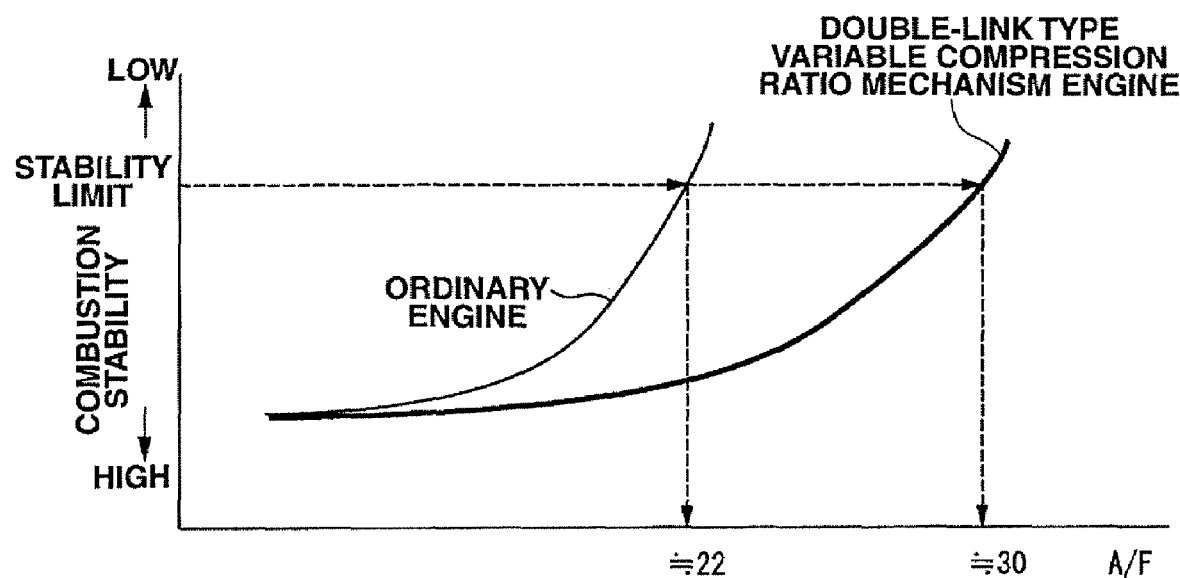
FIGS. 4A and 4B are diagrams showing operation characteristics of the double-link type variable compression ratio engine.
Figure 4B:
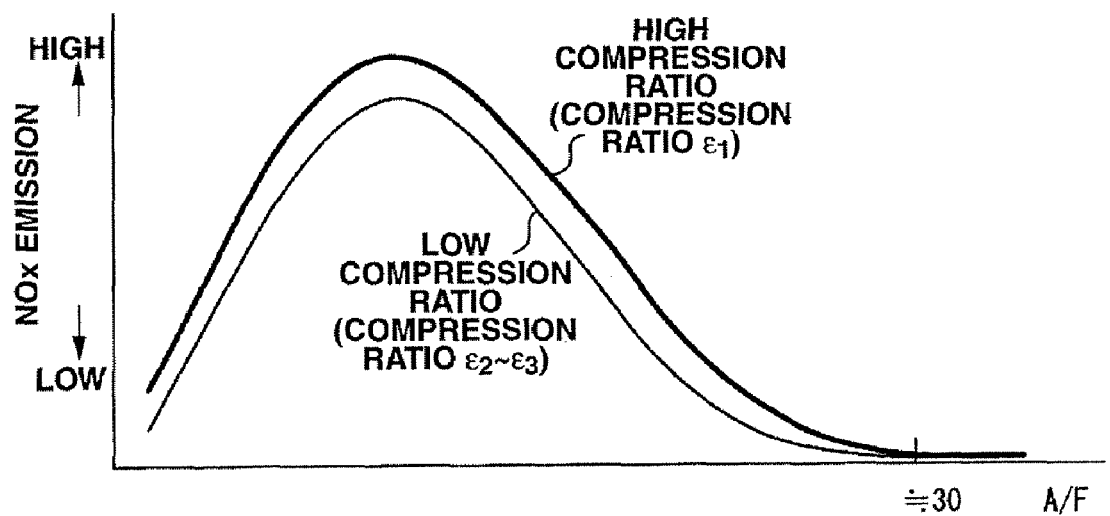

Because of the above piston behavior, the operation characteristics of double-link type variable compression ratio engine 10 are as shown in FIGS. 4A and 4B. FIG. 4A is a diagram showing the relationship of air-fuel ratio and combustion stability of double-link type variable compression ratio engine 10. In FIG. 4A, the characteristic line of the ordinary engine is indicated by a thin line, and the characteristic line of double-link type variable compression ratio engine 10 is indicated by a heavy line.

As shown in FIG. 4A, the ordinary engine (having a compression ratio of about 8:1 to 12:1) needs an air-fuel ratio of about 22:1 to secure combustion stability which is considerably leaner than a stoichiometric air-fuel ratio.

On the other hand, double-link type variable compression ratio engine 10 is unlikely to impair its stable combustion limit because the piston top dead center duration is relatively long. Engine 10 is thus able to secure combustion stability by increasing the compression ratio (to e.g. about 1.8) even when the air-fuel ratio is about 30.

FIG. 4B is a diagram showing the relationship of air-fuel ratio and NOx emission amount of double-link type variable compression ratio engine 10. In FIG. 4B, the characteristic lines of double-link type variable compression ratio engine 10 in the high-compression-ratio state and the low-compression-ratio state are indicated by a heavy line and a thin line, respectively.

As shown in FIG. 4B, the NOx emission amount is smaller in the low-compression-ratio state than in the high-compression-ratio state. There are however almost no NOx emissions, regardless of the compression ratio, when the air-fuel ratio is greater than or equal to about 30.

In this way, double-link type variable compression ratio engine 10 has the characteristics of being able to secure combustion stability even during ultra-lean combustion and generating almost no NOx emissions, regardless of the compression ratio, when the air-fuel ratio is greater than or equal to about 30 (the air excess coefficient is greater than or equal to about 2).

FIG. 5 is a schematic view of variable valve mechanism 200 for valve open and close timing control.

As mentioned above, a part of combustion gas is returned to the intake port (as internal EGR gas) with the valve open timing control of intake valve 81, so as to lower the concentration of oxygen in the combustion chamber, moderate the combustion in the cylinder 31a and decrease the combustion temperature for NOx emission reduction. The EGR gas bypassing EGR device 71, which is external to engine intake passage 60, is called "internal EGR gas". The internal EGR gas amount can be adjusted by means of variable valve mechanism 200 shown in FIG. 5. Variable valve mechanism 200 will be now explained below with reference to FIGS. 5 and 6.

Figure 6:
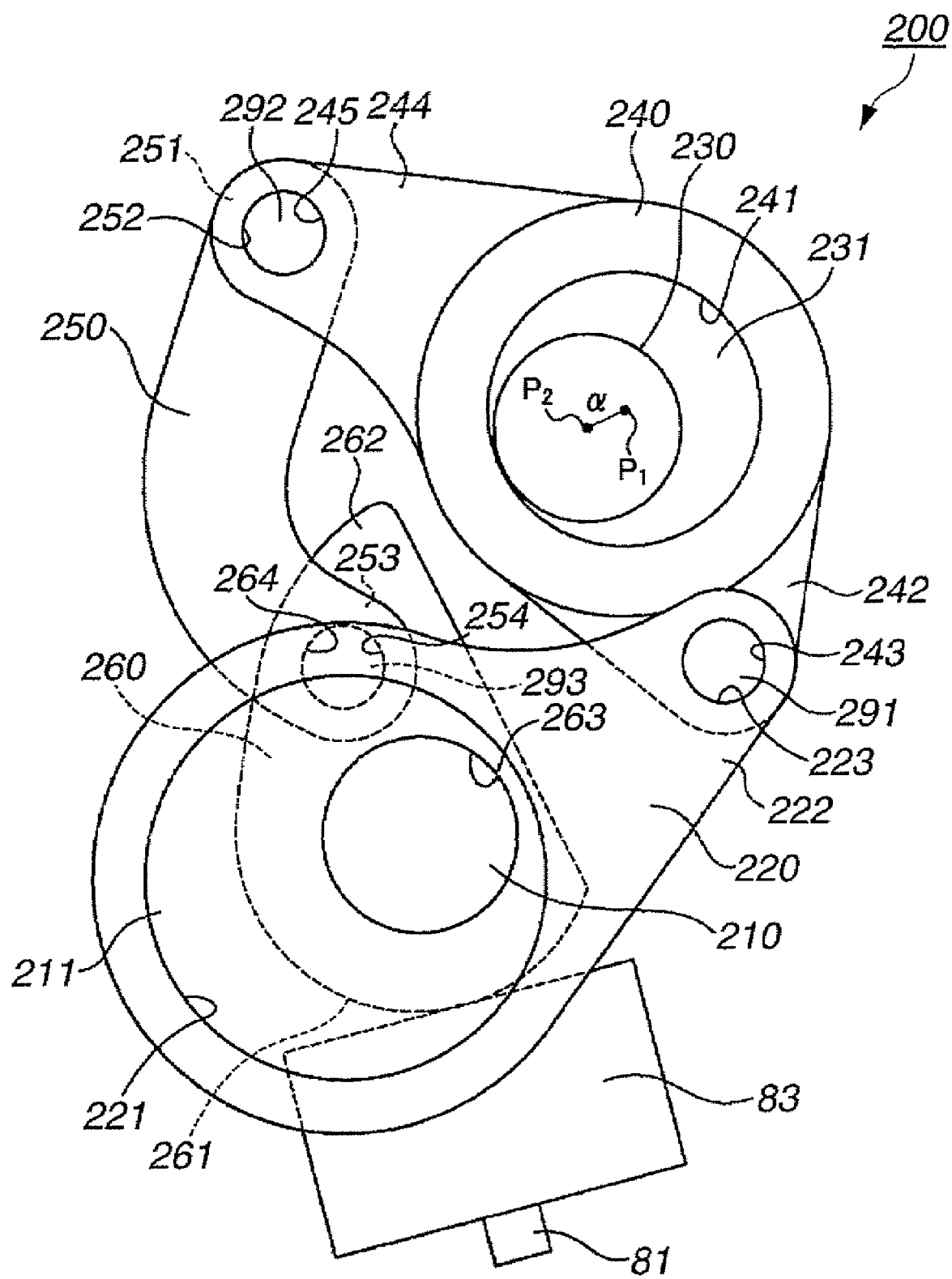
FIG. 6 is a schematic view of the variable valve mechanism, when viewed in the direction of a camshaft.

For example, variable valve mechanism 200 may be of the type disclosed in Japanese Laid-Open Patent Publication No. 11-107725A and shown in FIGS. 5 and 6.

Variable valve mechanism 200 includes camshaft 210, link arm 220, valve lift control shaft 230, locker arm 240, link member 250 and oscillating cam 260 arranged to open and close intake valve 81 in response to an oscillating movement of oscillating cam 260.

Camshaft 210 is rotatably supported on an upper portion of the engine cylinder head along the longitudinal direction of engine 10. One end of camshaft 210 is inserted in cam sprocket 270. When cam sprocket 270 rotates upon receipt of a torque from engine crankshaft, camshaft 210 becomes rotated hydraulically in synchronism with and relative to cam sprocket 270 so as to change the phase of camshaft 210 relative to cam sprocket 270. With this structure, the rotational phase of camshaft 210 relative to the crankshaft can be varied appropriately. Cam 211 is fixed to camshaft 210 such that cam 211 can rotate together with camshaft 210.

Link arm 220 is supported through cam 211.

Valve lift control shaft 230 is arranged in parallel with camshaft 211. Cam 231 is formed integrally on valve lift control shaft 230. Valve lift control shaft 230 is controlled by means of actuator 280 to rotate within a predetermined rotation angle range.

Locker arm 240 is supported through cam 231 and coupled to link arm 220.

Link member 250 is coupled to locker arm 240.

Oscillating cam 260 is rotatably fitted around camshaft 210 and coupled to link member 250 so as to push intake valve 81 downward via tappet 83 by its up-and-down movement.

FIG. 6 is a schematic view of variable valve mechanism 200, when viewed in the direction of camshaft 210. The structure of variable valve mechanism 200 will be explained below in more detail with reference to FIG. 6.

As explained above, variable valve mechanism 200 includes camshaft 210, link arm 220, valve lift control shaft 230, locker arm 240, link member 250 and oscillating cam 260 arranged to open and close intake valve 81 in response to the up-and-down movement of oscillating cam 260.

Hole 221 is formed in link arm 220, and cam 211 is engaged in hole 221. Pin hole 223 is further formed in protruding end 222 of link arm 220.

Cylindrical cam 231 is formed integrally on valve lift control shaft 230. The center P1 of cam 231 is displaced by a distance α from the axis P2 of valve lift control shaft 231.

Hole 241 is formed in locker arm 240, and cam 230 is engaged in hole 241 in such a manner that locker arm 240 can pivot about cam 231. Pin hole 243 is formed in one end 242 of locker arm 240. This pin hole 243 is aligned with pin hole 223 of link arm 220 so that pin 291 is inserted through pin holes 243 and 223 to connect locker arm 240 and link arm 220 together. Pin 291 is press-fitted and secured in pin hole 243. Pin hole 245 is formed in the other end 244 of locker arm 240. Pin 292 is press-fitted in pin hole 245 for connection to link member 250.

Pin insertion hole 252 is formed in one end 251 of link member 250 for connection to locker arm 240 via pin 292. Pin insertion hole 254 is formed in the other end 253 of link member 250.

Oscillating cam 260 has circular base portion 261 and cam nose 260 formed continuously. Support hole 263 is formed through circular base portion 261, and camshaft 230 is inserted through support hole 263 in such a manner that camshaft 210 can rotate within oscillating cam 260. Pin hole 264 is further formed in oscillating cam 260. Oscillating cam 260 is coupled to link member 250 by engagement of pin 263 in pin hole 264 and brought into contact with a predetermined upper portion of tappet 83.

The operations of variable valve mechanism 200 will be next explained with reference to FIGS. 7A, 7B, 8A and 8B.

Figure 7A:
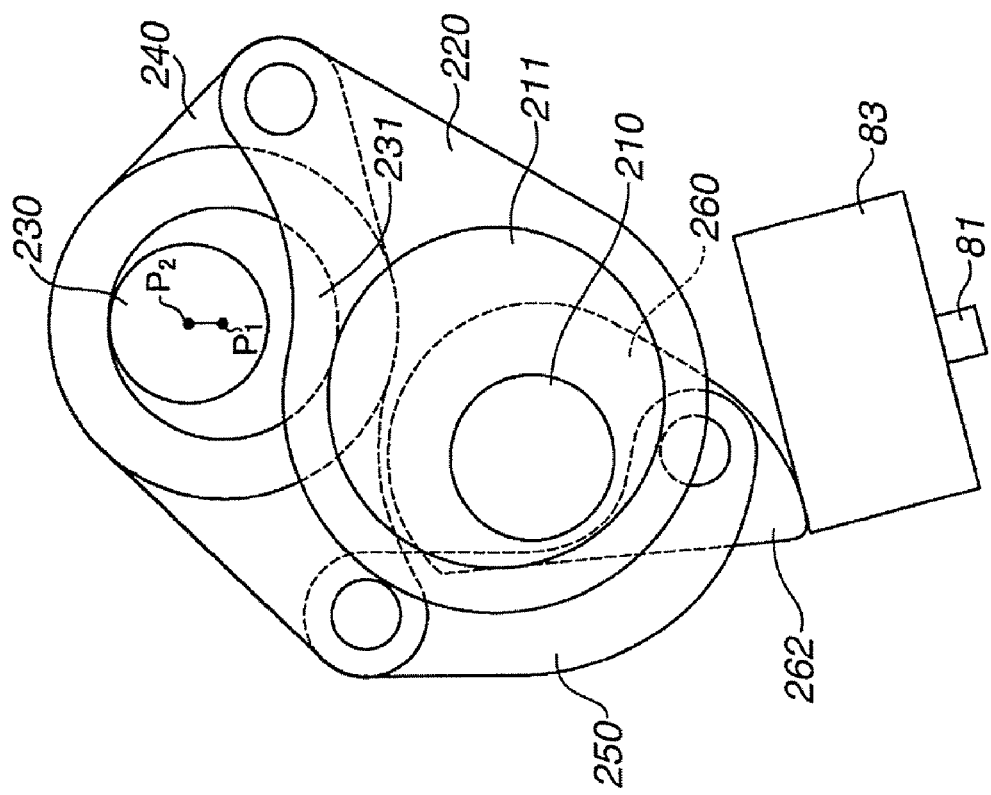
FIGS. 7A and 7B are schematic views of the variable valve mechanism in the state of being operated to attain a maximum intake valve lift.
Figure 7B:
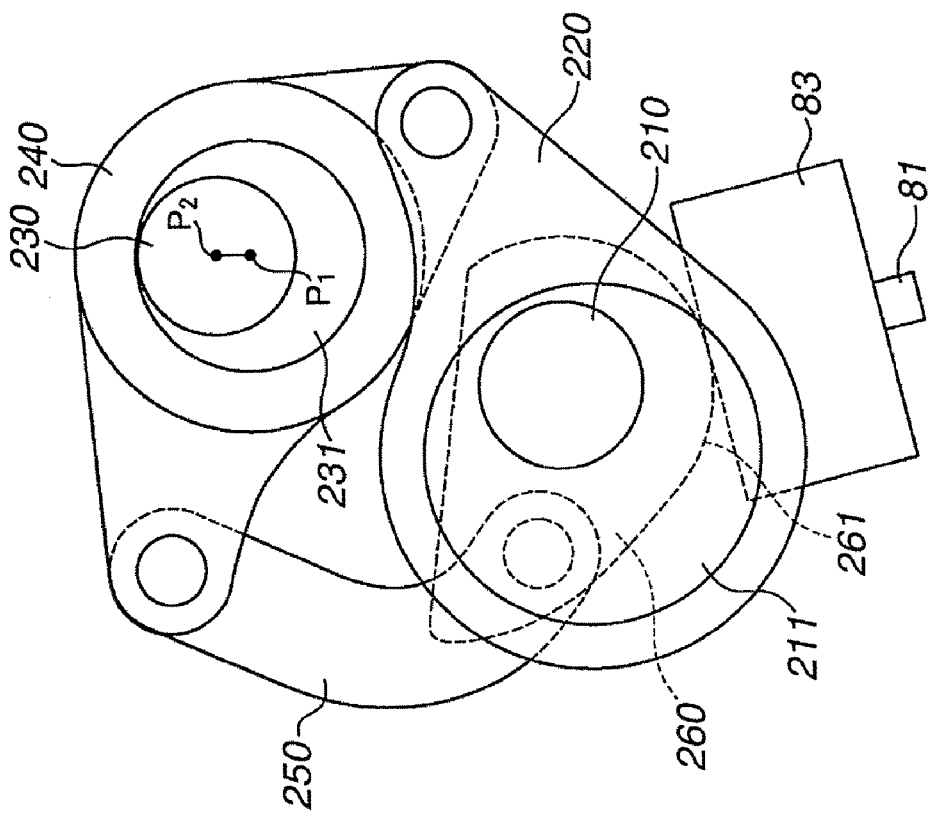

FIGS. 7A and 7B are schematic views of variable valve mechanism 200 in the state of being operated to attain a maximum intake valve lift and, more specifically, to reverse the oscillating direction of oscillating cam 260 in the case where intake valve 81 is closed, i.e., cam nose 262 is in the highest position and where intake valve 81 is opened, i.e., cam nose 262 is in the lowest position.

Figure 8A:
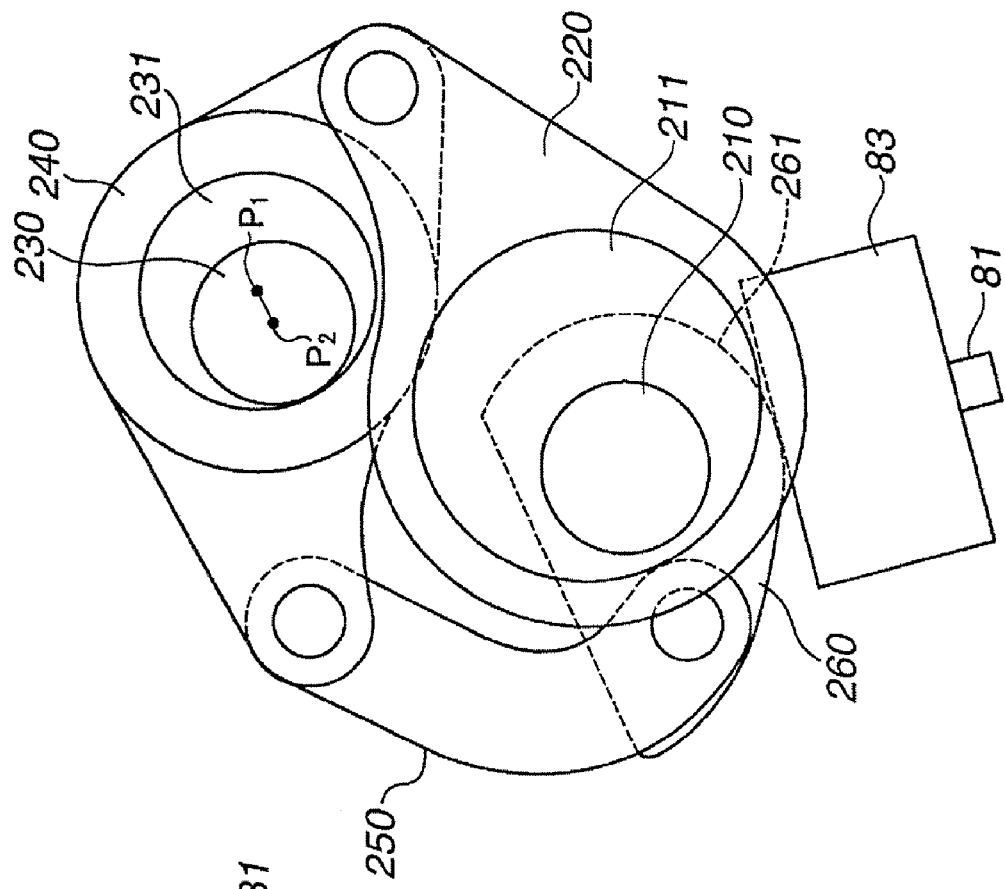
FIGS. 8A and 8B are schematic views of the variable valve mechanism in the state of being operated to attain a minimum intake valve lift.
Figure 8B:
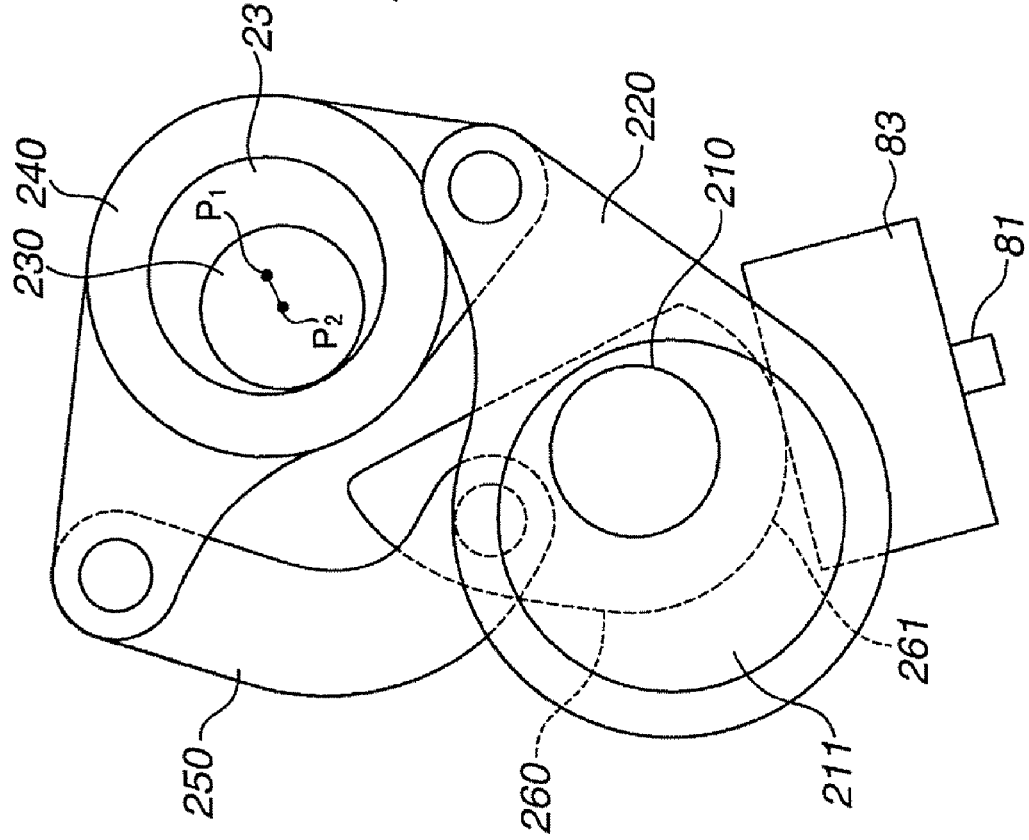

FIGS. 8A and 8B are schematic views of variable valve mechanism 200 in the state of being operated to attain a minimum intake valve lift and, more specifically, to reverse the oscillating direction of oscillating cam 260 in the case where cam nose 262 is in the highest position and where cam nose 262 is in the lowest position. The maximum lift amount of intake valve 81 is set to zero in the present embodiment. For this reason, intake valve 81 is kept closed in FIGS. 8A and 8B irrespective of the movement of oscillating cam 260.

In order to increase the intake valve lift amount, the position of cam 231 is lowered by rotation of valve lift control shaft 230 in such a manner that the center P1 of cam 231 becomes located below the axis P2 of valve lift control shaft 2 as shown in FIGS. 7A and 7B. Then, the whole of locker arm 240 shifts downward. When camshaft 210 is driven in this state, the driving power is transmitted from camshaft 210 to link arm 220, locker arm 240, link member 250 and then oscillating cam 260.

If cam 211 is located on the left side relative to camshaft 210 as shown in FIG. 7A, circular base portion 261 of oscillating cam 260 is held in contact with tappet 83 so as to close intake valve 81.

If cam 211 is located on the right side relative to camshaft 210 as shown in FIG. 7B, cam nose 262 of oscillating cam 260 is held into contact with tappet 83 so as to open intake valve 81.

In order to decrease the intake valve lift amount, the position of cam 231 is raised by rotation of valve lift control shaft 230 in such a manner that the center P1 of cam 231 becomes located on the diagonally upper right side of the axis P2 of valve lift control shaft 2 as shown in FIGS. 8A and 8B. Then, the whole of locker arm 240 shifts upward. When camshaft 210 is rotated in this state, the rotation power is transmitted from camshaft 210 to link arm 220, locker arm 240, link member 250 and then oscillating cam 260.

If cam 211 is located on the left side relative to camshaft 210 as shown in FIG. 8A, circular base portion 261 of oscillating cam 260 is held in contact with tappet 83 so as to close intake valve 81.

Even if cam 211 is located on the right side relative to camshaft 210 as shown in FIG. 8B, circular base portion 261 of oscillating cam 260 is held in contact with tappet 83 so as to close intake valve 81.

In this way, intake valve 81 is kept closed, irrespective of whether oscillating cam 60 is oscillated by rotation of camshaft 210, in the case where the position of cam 231 is raised by rotation of valve lift control shaft 230 in such a manner that the cam center P1 is located on the diagonally upper right side of the shaft axis P2.

Figure 9:
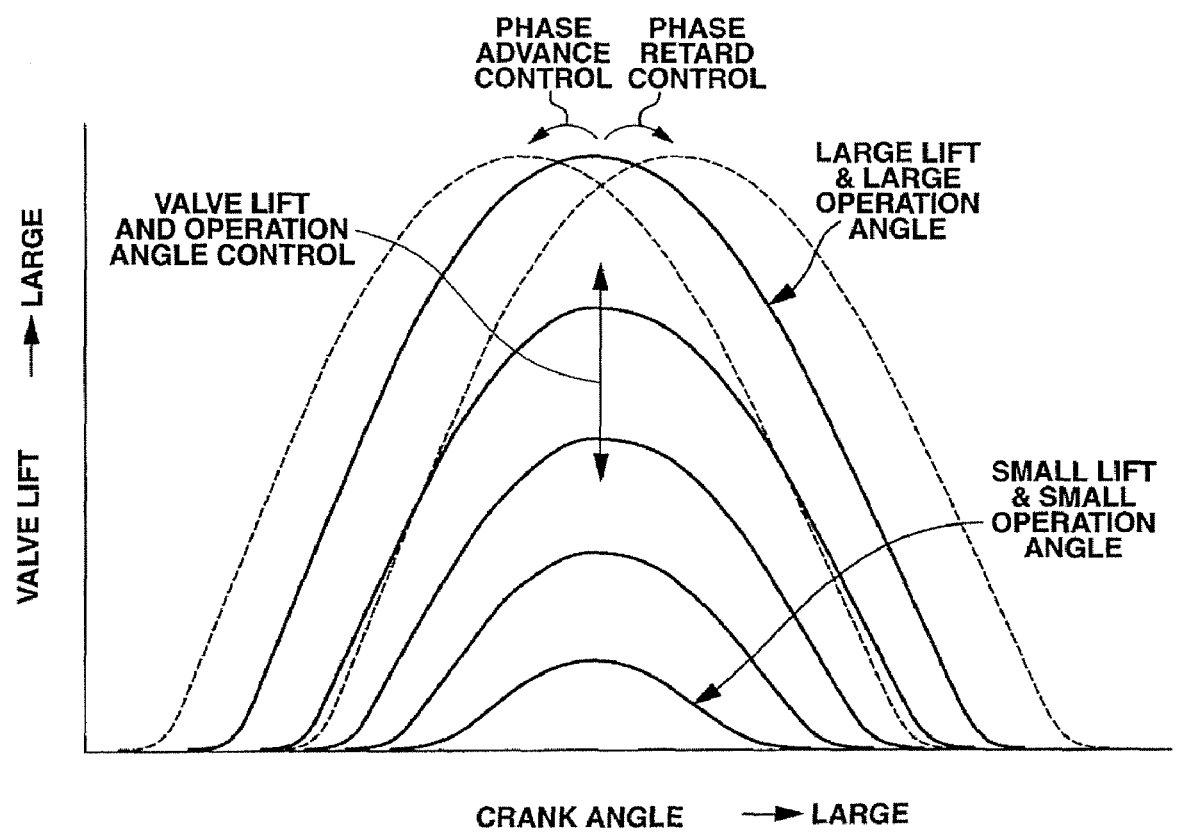
FIG. 9 is a diagram showing intake valve lift and open/close timing control characteristics of the variable valve mechanism.

FIG. 9 is a diagram showing intake valve lift and open/close timing control characteristics of variable valve mecha-nism 200. In FIG. 9, the intake valve lift and open/close timing control characteristics with rotation of valve lift control shaft 230 are indicated by solid lines, and the intake valve lift and open/close timing control characteristics with change of the phase of camshaft 210 relative to cam sprocket 270 are indicated by broken lines.

With the use of the above-structured variable valve mechanism 200, the valve lift amount, operation angle and valve lift center phase of intake valve 81 can be varied continuously and freely as shown in FIG. 9 by changing the angular position of valve lift control shaft 230 and the phase of camshaft 210 relative to cam sprocket 270.

Figure 10:
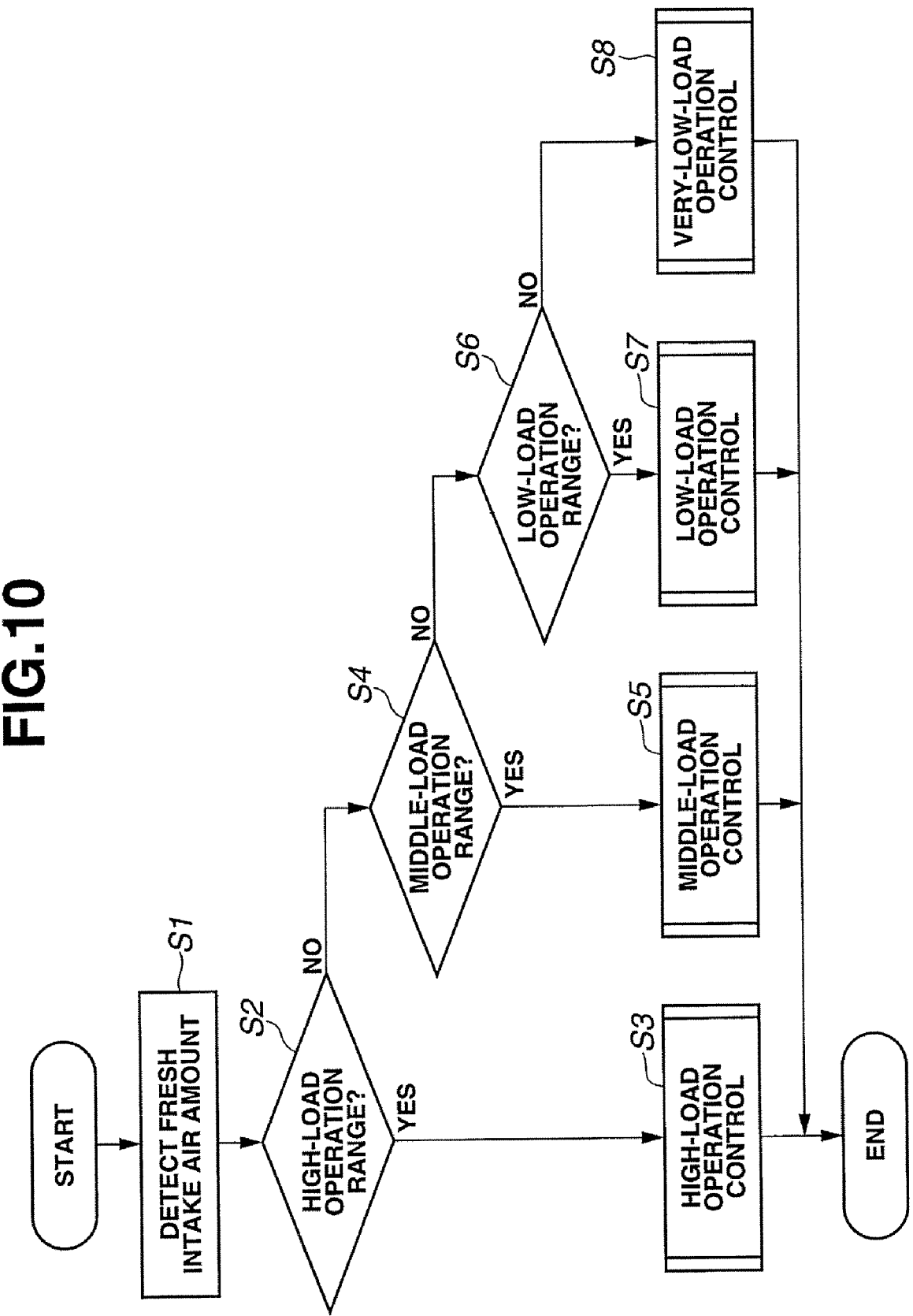
FIG. 10 is a flow chart for a main control routine of the NOx emission reduction apparatus according to a first embodiment of the present invention.

FIG. 10 is a flow chart for a main control routine program of the NOx emission reduction apparatus according to the first embodiment of the present invention.

In the present embodiment, engine 10 has a plurality of operation ranges: a high-load operation range, a middle-load operation range, a low-load operation range and a very-low-load operation range. The high-load operation range is defined as an operation range in which engine 10 is operable even at a minimum mechanical compression ratio (including full load). The middle-load operation range is defined as an operation range in which the load is lower than in the high-load operation range and the EGR rate of the external EGR gas can be increased. In the middle-load operation range, the mechanical compression ratio is controlled according to the load. The low-load operation range is defined as an operation range in which the load is lower than in the middle-load operation range and the EGR rate of the external EGR gas reaches a lean combustion EGR limit rate (corresponding to the rate of EGR gas amount at which combustion stability can be maintained with respect to the fresh intake air amount). In the low-load operation range, so-called miller cycle operations are performed to set the intake valve open timing IVO before the intake bottom dead center for improvement in fuel efficiency. The very-low-load operation range is defined as an operation range in which the load is lower than in the low-load operation range and the introduction of the internal EGR gas is required due to the difficulty of the engine operations with the introduction of the external EGR gas. The internal EGR gas has a higher gas temperature than that of the external EGR gas and thus provides combustion stability. These operation ranges are predetermined, and the characteristic maps of the respective operation ranges are stored in the ROM. If the internal EGR gas is introduced to the engine cylinder 31a in the high-, middle- and low-load operation ranges (where the load is higher than in the very-low-load operation range), the cylinder temperature increases to cause a decrease in intake charging efficiency. For this reason, the external EGR gas is introduced to the engine cylinder 31a in the high-, middle- and low-load operation ranges.

At step S1, controller 50 detects the fresh intake air amount based on the detection signal from airflow sensor 61.

At step S2, controller 50 determines whether engine 10 is in the high-load operation range. If engine 10 is in the high-load operation range, the program control proceeds to step S3. The program control proceeds to step S4 at all other times.

At step S3, controller 50 performs high-load operation control. The details of the high-load operation control will be described later.

At step S4, controller 50 determines whether engine 10 is in the middle-load operation range. If engine 10 is in the middle-load operation range, the program control proceeds to step S5. The program control proceeds to step S6 at all other times.

At step S5, controller 50 performs middle-load operation control. The details of the middle-load operation control will be described later.

At step S6, controller 50 determines whether engine 10 is in the low-load operation range. If engine 10 is in the low-load operation range, the program control proceeds to step S7. The program control proceeds to step S8 at all other times.

At step S7, controller 50 performs low-load operation control. The details of the low-load operation control will be described later.

At step S8, controller 50 performs very-low-load operation control. The details of the very-low-load operation control will be described later.

Figure 11:
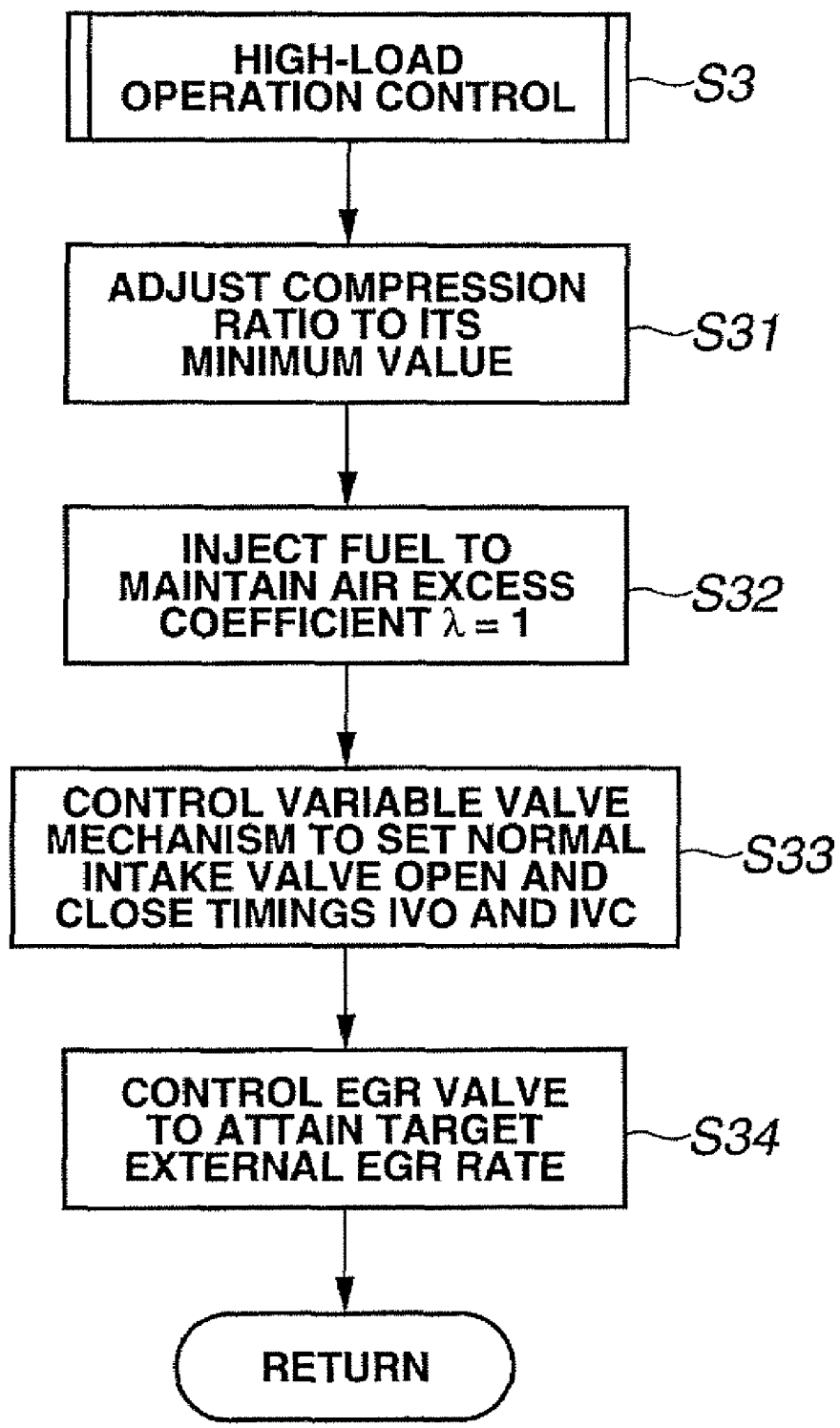
FIG. 11 is a flow chart for a high-load operation control routine of the NOx emission reduction apparatus according to the first embodiment of the present invention.

FIG. 11 is a flow chart for a routine program of the high-load operation control.

At step S31, controller 50 controls actuator 51 to adjust the mechanical compression ratio to its minimum degree.

At step S32, controller 50 controls fuel injection valve 63 to inject fuel in such a manner as to adjust the air excess coefficient to 1.

At step S33, controller 50 controls variable valve mechanism 200 to set the intake valve open and close timings IVO and IVC normally.

At step S34, controller 50 controls EGR valve 71a to adjust its valve opening in such a manner as to attain a target EGR rate, which has previously been determined according to the load. Herein, controller 50 may be configured to store e.g. in the ROM a characteristic map experimentally set to determine the EGR valve opening in accordance with the target EGR rate.

Figure 12:
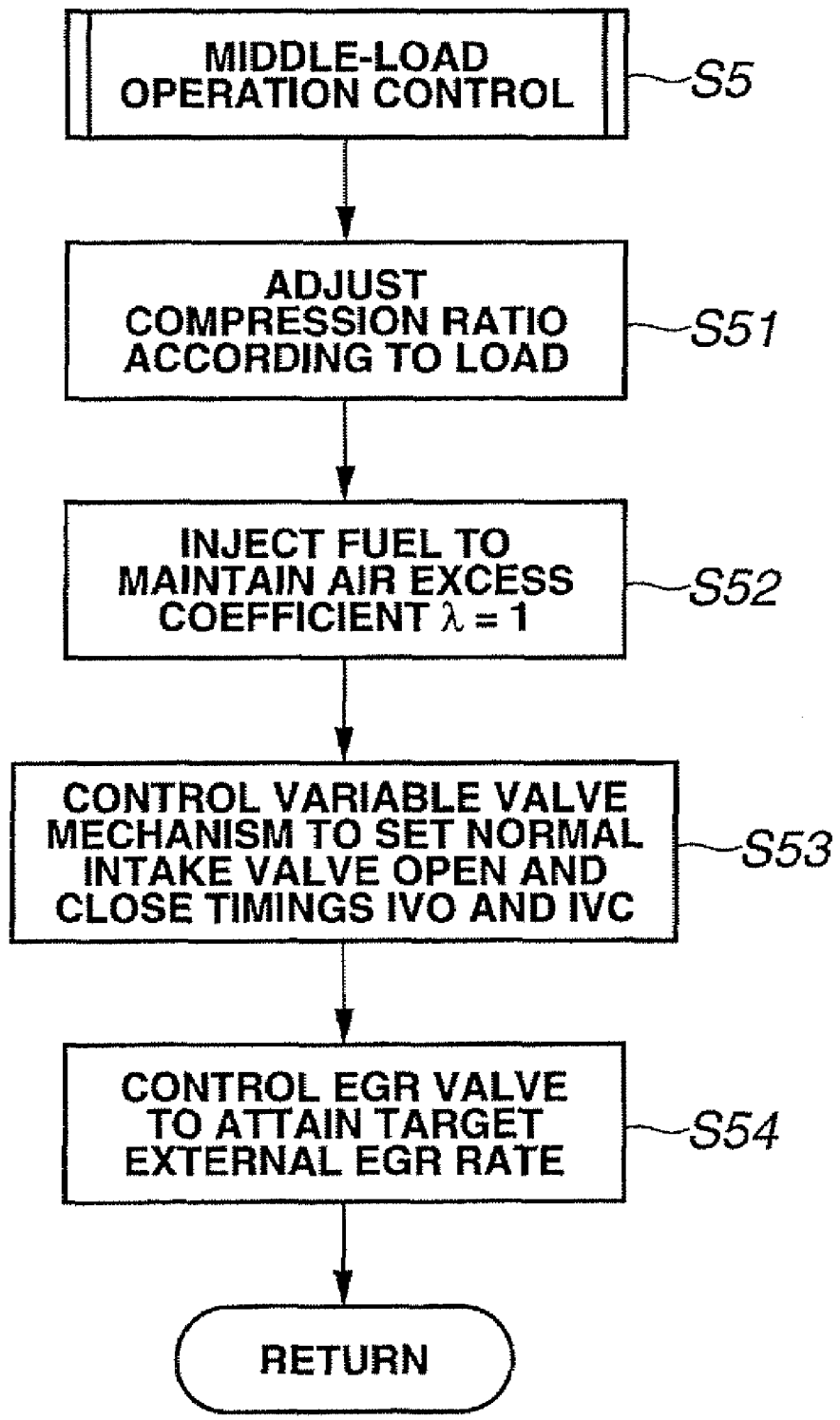
FIG. 12 is a flow chart for a middle-load operation control routine of the NOx emission reduction apparatus according to the first embodiment of the present invention.

FIG. 12 is a flow chart for a routine program of the middle-load operation control.

At step S51, controller 50 controls actuator 51 to adjust the mechanical compression ratio according to the load. Controller 50 may be configured to store e.g. in the ROM a characteristic map experimentally set to determine the mechanical compression ratio in accordance with the load.

At step S52, controller 50 controls fuel injection valve 63 to inject fuel in such a manner as to adjust the air excess coefficient to 1.

At step S53, controller 50 controls variable valve mechanism 200 to set the intake valve open and close timings IVO and IVC normally.

At step S54, controller 50 controls EGR valve 71a to adjust its valve opening in such a manner as to attain a target EGR rate, which has previously been determined according to the load. Controller 50 may be configured to store e.g. in the ROM a characteristic map experimentally set to determine the EGR valve opening in accordance with the target EGR rate.

Figure 13:
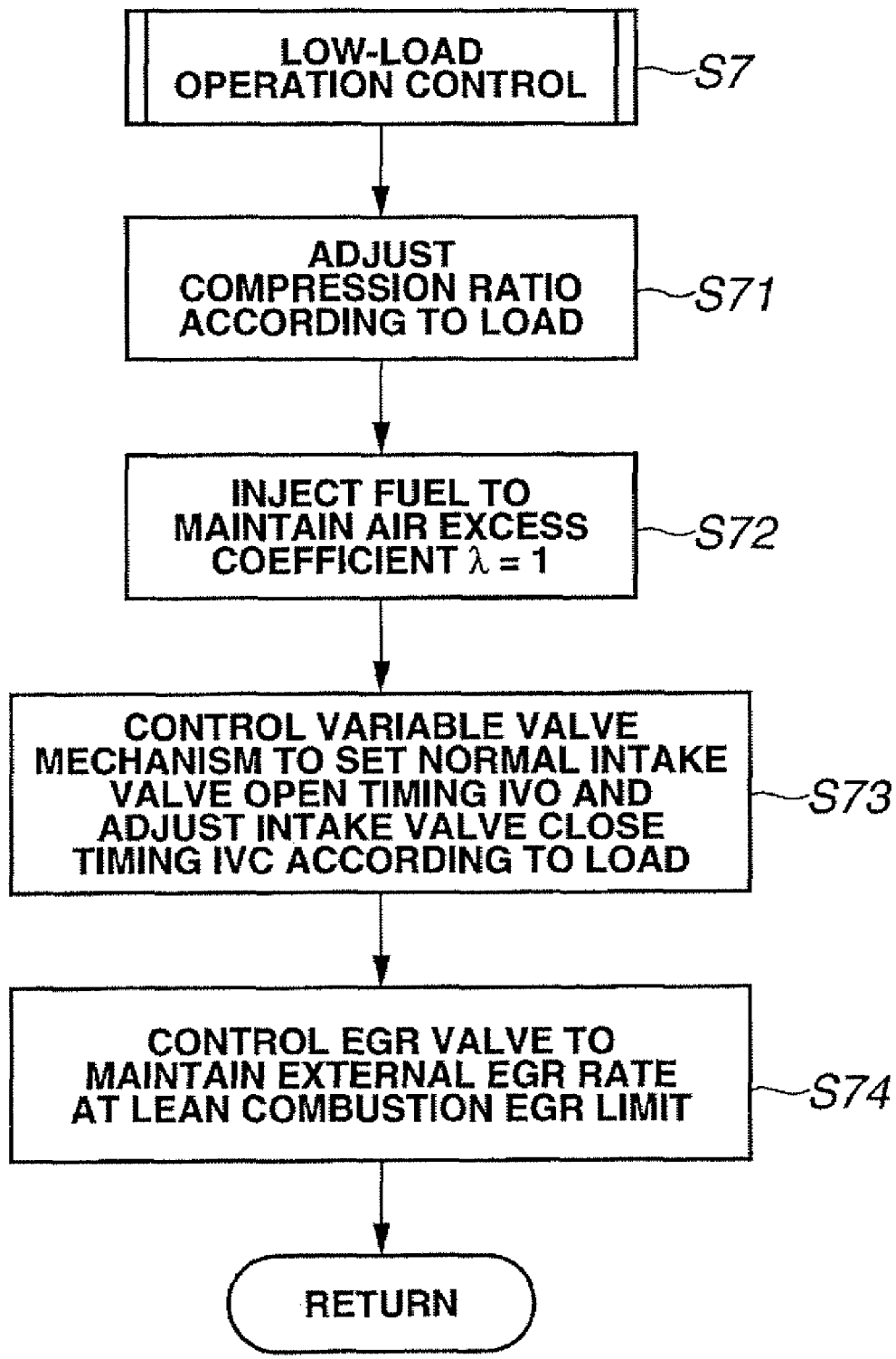
FIG. 13 is a flow chart for a low-load operation control routine of the NOx emission reduction apparatus according to the first embodiment of the present invention.

FIG. 13 is a flow chart for a routine program of the low-load operation control.

At step S71, controller 50 controls actuator 51 to adjust the mechanical compression ratio according to the load. Controller 50 may be configured to store e.g. in the ROM a characteristic map experimentally set to determine the mechanical compression ratio in accordance with the load. In effect, the characteristic map may be a look up table that relates a number of load levels to respective compression ratios.

At step S72, controller 50 controls fuel injection valve 63 to inject fuel in such a manner as to adjust the air excess coefficient to 1.

At step S73, controller 50 controls variable valve mechanism 200 to set the intake valve open timing IVO normally and to adjust the intake valve close timing IVC according to the load. Controller 50 may be configured to store e.g. in the ROM a characteristic map experimentally set to determine the intake valve close timing IVC in accordance with the load.

At step S74, controller 50 controls EGR valve 71a to adjust its valve opening in such a manner as to maintain the external EGR rate at the predetermined lean combustion EGR limit rate (e.g. 20 to 30%). Herein, controller 50 may be configured to store e.g. in the ROM a characteristic map experimentally set to determine the EGR valve opening.

Figure 14:
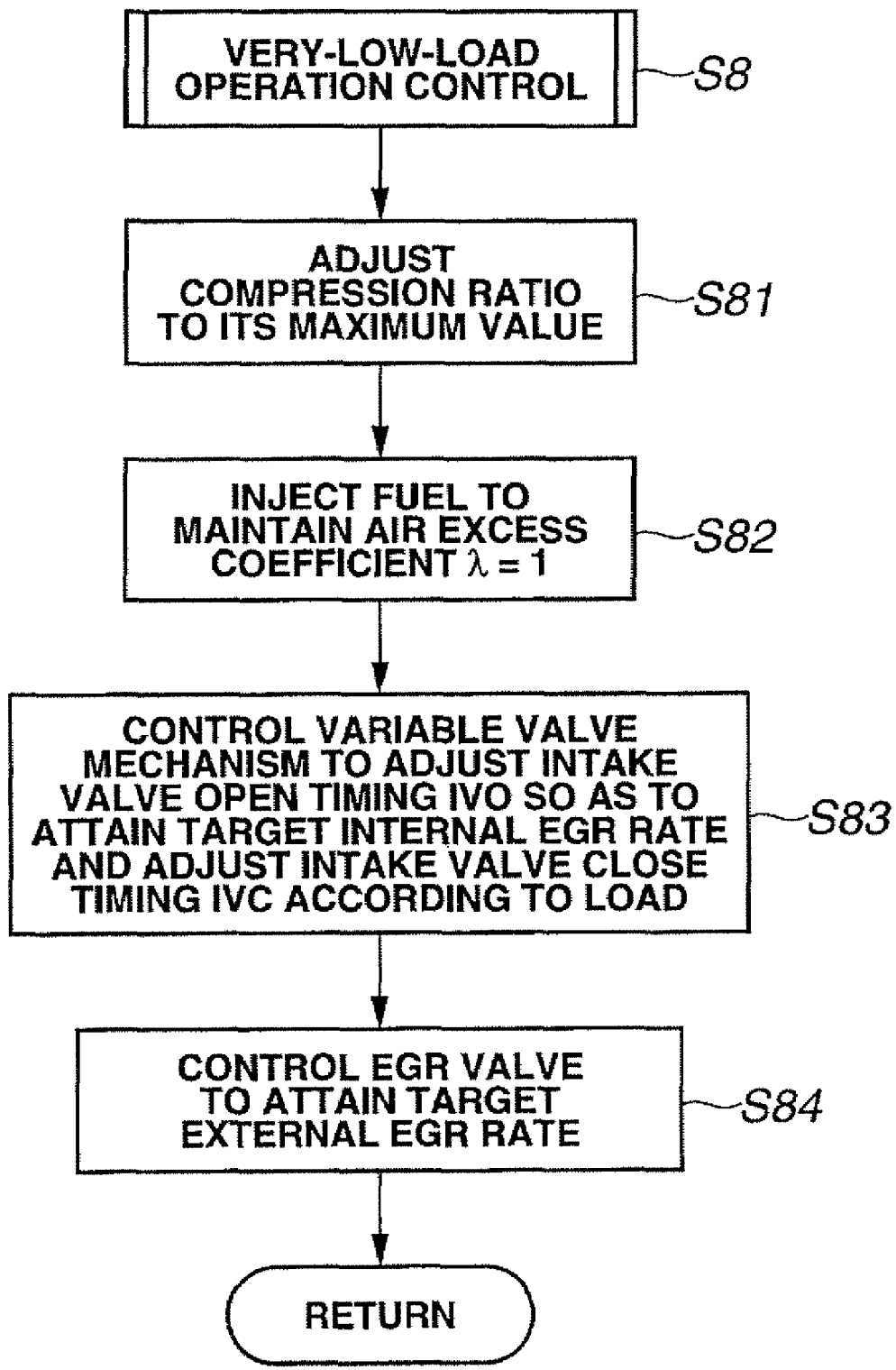
FIG. 14 is a flowchart for a very-low-load operation control routine of the NOx emission reduction apparatus according to the first embodiment of the present invention.

FIG. 14 is a flow chart for a routine program of the very-low-load operation control.

At step S81, controller 50 controls actuator 51 to adjust the mechanical compression ratio to its maximum degree.

At step S82, controller 50 controls fuel injection valve 63 to inject fuel in such a manner as to adjust the air excess coefficient to 1.

At step S83, controller 50 controls variable valve mechanism 200 to set the intake valve open timing IVO in such a manner as to attain a target internal EGR rate, which has previously determined according to the load, and to set the intake valve close timing IVC according to the load. Controller 50 may be configured to store e.g. in the ROM a characteristic map experimentally set to determine the intake valve open timing IVO in accordance with the target internal EGR rate. Controller 50 may also be configured to store e.g. in the ROM a characteristic map experimentally set to determine the intake valve close timing IVC in accordance with the load. As above, the characteristic map may be a look up table where load levels can be used to retrieve a respective intake vale close timing for the load level.

At step S84, controller 50 determines a target external EGR rate to maintain the predetermined lean combustion EGR limit rate and controls EGR valve 71a in such a manner as to attain the target external EGR rate. Herein, controller 50 may be configured to store e.g. in the ROM a characteristic map experimentally set to determine the EGR valve opening.

FIGS. 15A to 15H are time charts showing engine operations under the control of the NOx emission reduction apparatus according to the first embodiment of the present invention. By way of example, an explanation will be given to the case where the engine load changes from a full load at time t0 to a very low load. It is noted that, for clear understanding of the correspondences between the time charts and the flow charts, the step numbers of the flow charts are indicated below together with the chart numbers of the time charts.

Figure 15:
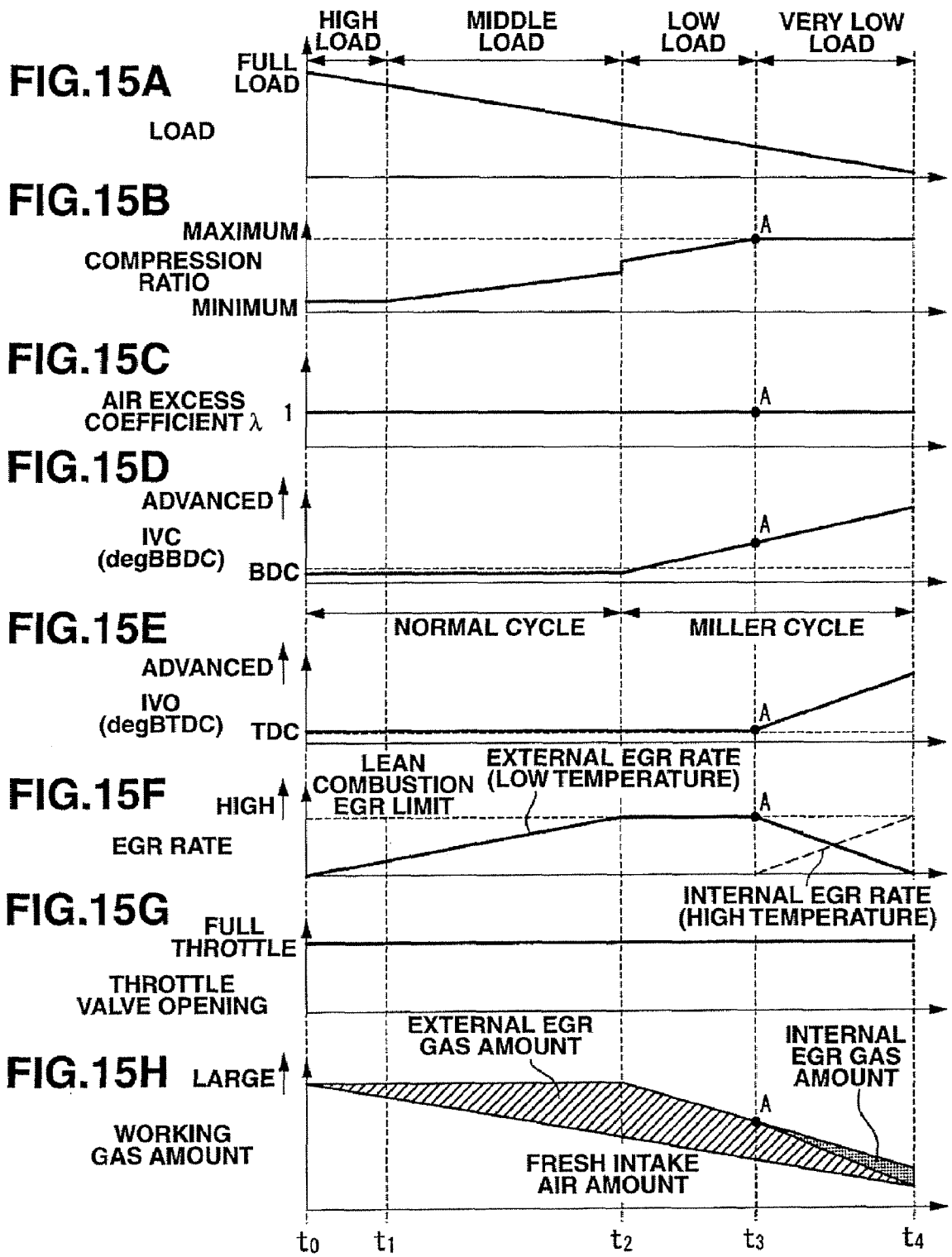
FIGS. 15A to 15H are time charts showing engine operations under the control of the NOx emission reduction apparatus according to the first embodiment of the present invention.

During a period from time t0 to time t1, controller 50 repeats steps S1, S2 and S3 for the high-load operation control. The mechanical compression ratio is adjusted to the minimum degree (FIG. 15B, S51). The fuel is injected to adjust the air excess coefficient λ to 1 (FIG. 15C, S52). The intake valve open and close timings IVO and IVC are set normally (FIGS. 15D and 15E, S33). The EGR valve opening is controlled to attain the target EGR rate (FIG. 16F, S34). By the above procedure, the amount of external EGR gas in working medium is regulated appropriately (FIG. 15H).

When the engine load decreases and shifts into the middle-load operation range at time t1, controller 50 repeats steps S1, S2, S4 and S5 for the middle-load operation control. The mechanical compression ratio is adjusted in accordance with the load (FIG. 15B, S51). The fuel is injected to adjust the air excess coefficient λ to 1 (FIG. 15C, S52). The intake valve open and close timings IVO and IVC are set normally (FIGS. 15D and 15E, S53). The EGR valve opening is controlled to attain the target EGR rate (FIG. 16F, S54). The amount of external EGR gas in working medium is increased by the above procedure (FIG. 15H).

When the engine load further decreases and shifts into the low-load operation range at time t2, controller 50 repeats steps S1, S2, S4, S6 and S7 for the low-load operation control. The mechanical compression ratio is adjusted in accordance with the load (FIG. 15B, S71). The fuel is injected to adjust the air excess coefficient $\lambda$ to 1 (FIG. 15C, S72). Variable valve mechanism 200 is controlled to set the intake valve open timing IVO normally and to adjust the intake valve close timing IVC in accordance with the load (FIGS. 15D and 15E, S73) for miller cycle operations. The EGR valve opening is controlled in such a manner as to maintain the external EGR gas maintains at the lean combustion EGR limit rate (FIG. 15F, S74). By the above procedure, the maximum possible amount of EGR gas is supplied to maintain the lean combustion EGR limit rate (FIG. 15H) even when the working medium amount decreases with load. Further, the combustion stability is insured by controlling the mechanical compression ratio to its maximum degree even when the effective compression ratio decreases during the miller cycle operations.

When the engine load further decreases and shifts into the very-low-load operation range at time t3, controller 50 repeats steps S1, S2, S4, S6 and S8 for the very-low-load operation control. The mechanical compression ratio is adjusted to the maximum degree (FIG. 15B, 581). The fuel is injected to adjust the air excess coefficient $\lambda$ to 1 (FIG. 15C, S82). Variable valve mechanism 200 is controlled to adjust the intake valve open timing IVO in such a manner as to attain the target internal EGR rate and to adjust the intake valve close timing IVC in accordance with the load (FIGS. 15D and 15E, S83) for miller cycle operations. The EGR valve opening is controlled to supply the external EGR gas in such a manner as to maintain the lean combustion EGR limit rate by the total of the external EGR rate and the internal EGR rate (FIG. 15F, S84). The lean combustion EGR limit rate is maintained by the above procedure (FIG. 15H) even when the working medium amount further decreases with load.

It is therefore possible according to the present embodiment to supply the EGR gas appropriately in accordance with the engine load in the high- and middle-load operation ranges and to supply the maximum possible amount of EGR gas while maintaining the lean combustion EGR limit rate in the low- and very-low-load operation ranges for stable engine operations and NOx emission reduction.

Second Embodiment

Figure 16:
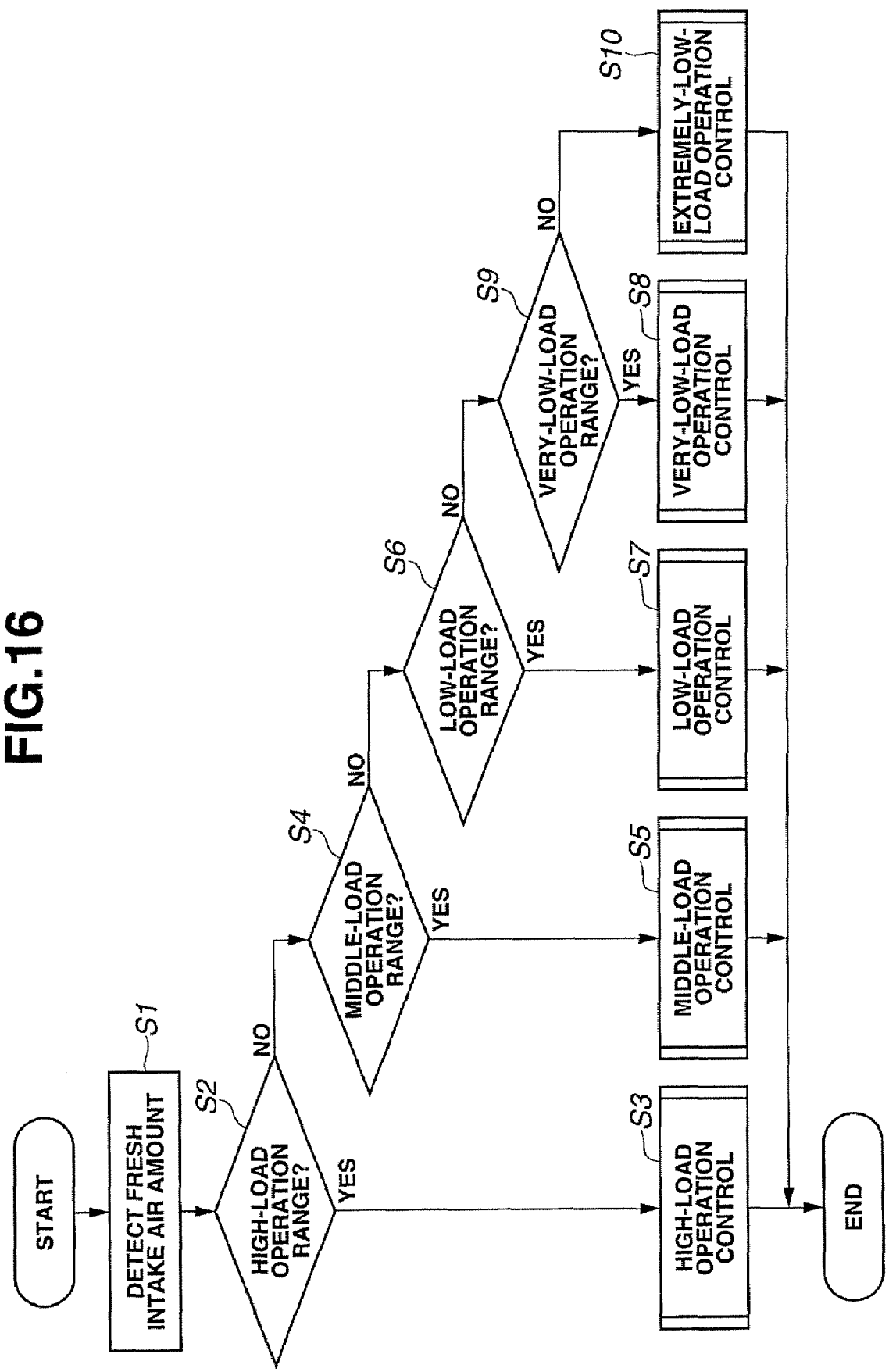
FIG. 16 is a flow chart for a main control routine of the NOx emission reduction apparatus according to a second embodiment of the present invention.

FIG. 16 is a flow chart for a main control routine program of the NOx emission reduction apparatus according to the second embodiment of the present invention.

Double-link type variable compression ratio engine 10 varies the mechanical compression ratio by changing the piston top dead center as mentioned above. Further, variable valve mechanism 200 varies the intake valve open period and valve lift amount such that the intake valve lift increases with the intake valve open period as shown in FIG. 9. There thus arises a possibility that, depending on the compression ratio, the piston top dead center becomes so high that intake valve 81 may interfere with piston 32 especially when the intake valve open timing is advanced.

In the present embodiment, the control routine is performed to prevent intake valve 81 from interfering with piston 32 and to maintain the ratio between the internal EGR rate and the external EGR rate constant (e.g. in such a manner as to maintain the ratio of the internal EGR rate with respect to the total amount of the internal EGR gas and the external EGR gas at 50% or higher) by limiting the amount of advance of the intake valve open timing IVO (and thereby limiting the intake valve lift). The details of this control routine will be explained below with reference to FIG. 16.

In the control routine, steps S1 to S8 are common to the first and second embodiment. An explanation of steps S1 to S8 will be thus omitted.

At step S9, controller 50 determines whether engine 10 is in the very-low-load operation range. The very-low-load operating range is defined as the operation range in which the load is lower than in the low-load operation range and there is a necessity to introduce the internal EGR gas but no possibility of interference of intake valve 81 with piston 32. If engine 10 is in the very-low-load operation range, the program control proceeds to step S8. The program control proceeds to step S10 at all other times.

At step S10, controller 50 performs extremely-low-load operation control. The details of the extremely-low-load operation control will be described later.

Figure 17:
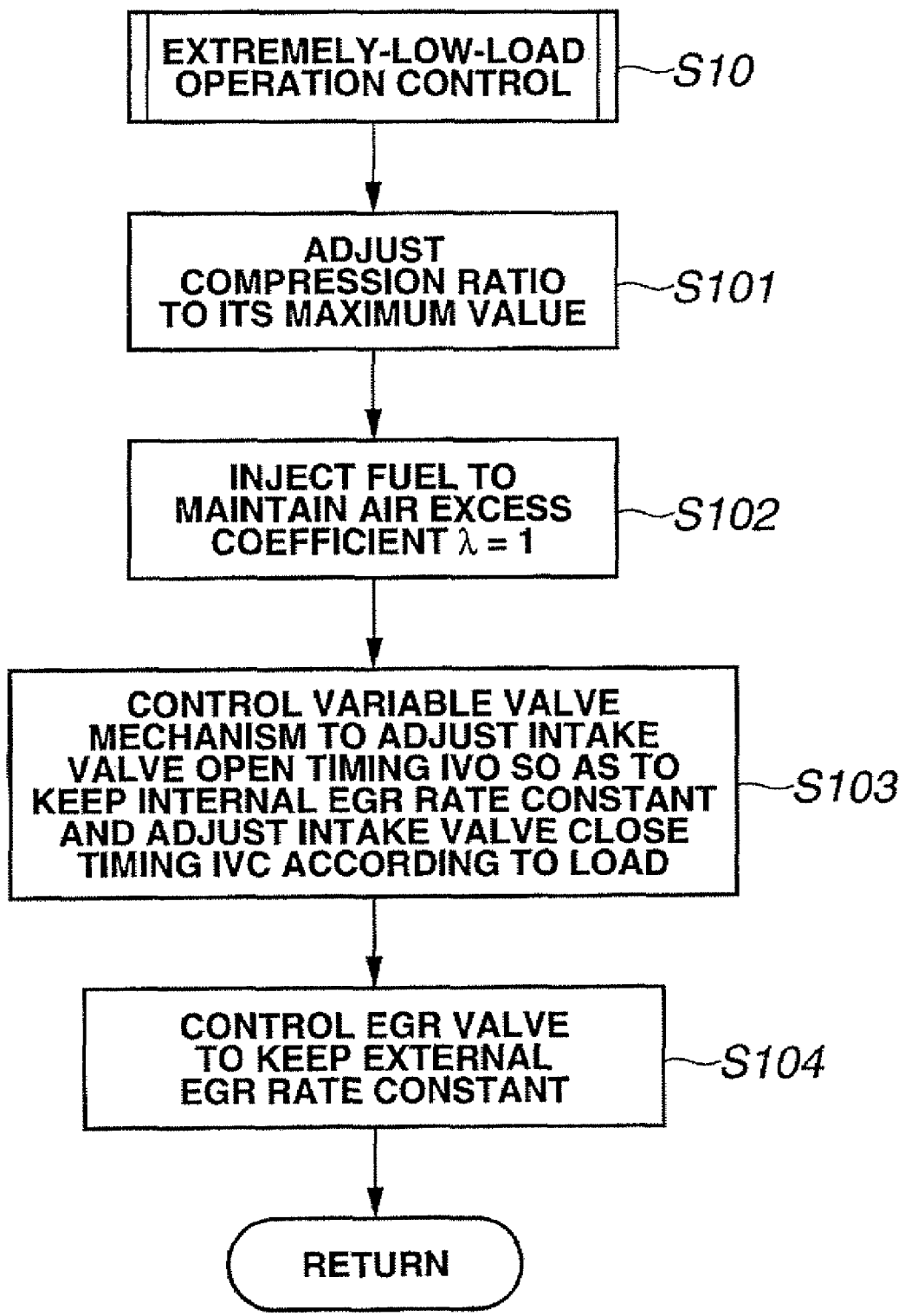
FIG. 17 is a flowchart for an extremely-low-load operation control routine of the NOx emission reduction apparatus according to the second embodiment of the present invention.

FIG. 17 is a flowchart for a routine program of the extremely-low-load operation control according to the second embodiment.

At step S101, controller 50 controls actuator 51 to adjust the mechanical compression ratio to its maximum degree.

At step 5102, controller 50 controls fuel injection valve 63 to inject fuel in such a manner as to adjust the air excess coefficient to 1.

At step 5103, controller 50 controls variable valve mechanism 200 to set the intake valve open timing IVO in such a manner as to attain a target internal EGR rate, which has previously determined according to the load, and to set the intake valve close timing IVC according to the load. Controller 50 may be configured to store e.g. in the ROM a characteristic map experimentally set to determine the intake valve open timing IVO in accordance with the target internal EGR rate. Controller 50 may also be configured to store e.g. in the ROM a characteristic map experimentally set to determine the intake valve close timing IVC in accordance with the load.

At step S104, controller 50 controls EGR valve 71a to adjust its valve opening and supply the external EGR gas in such a manner as to maintain the lean combustion EGR limit rate by the total of the external EGR rate and the internal EGR rate. Controller 50 may be configured to store e.g. in the ROM a characteristic map experimentally set to determine the EGR valve opening.

FIGS. 18A to 18H are time charts showing engine operations under the control of the NOx emission reduction apparatus according to the second embodiment of the present invention. The engine operations under the control of the NOx emission reduction apparatus during the period up to time t3 are the same in the first and second embodiments. An explanation of the engine operations during the period up to time t3 will be thus omitted.

Figure 18:
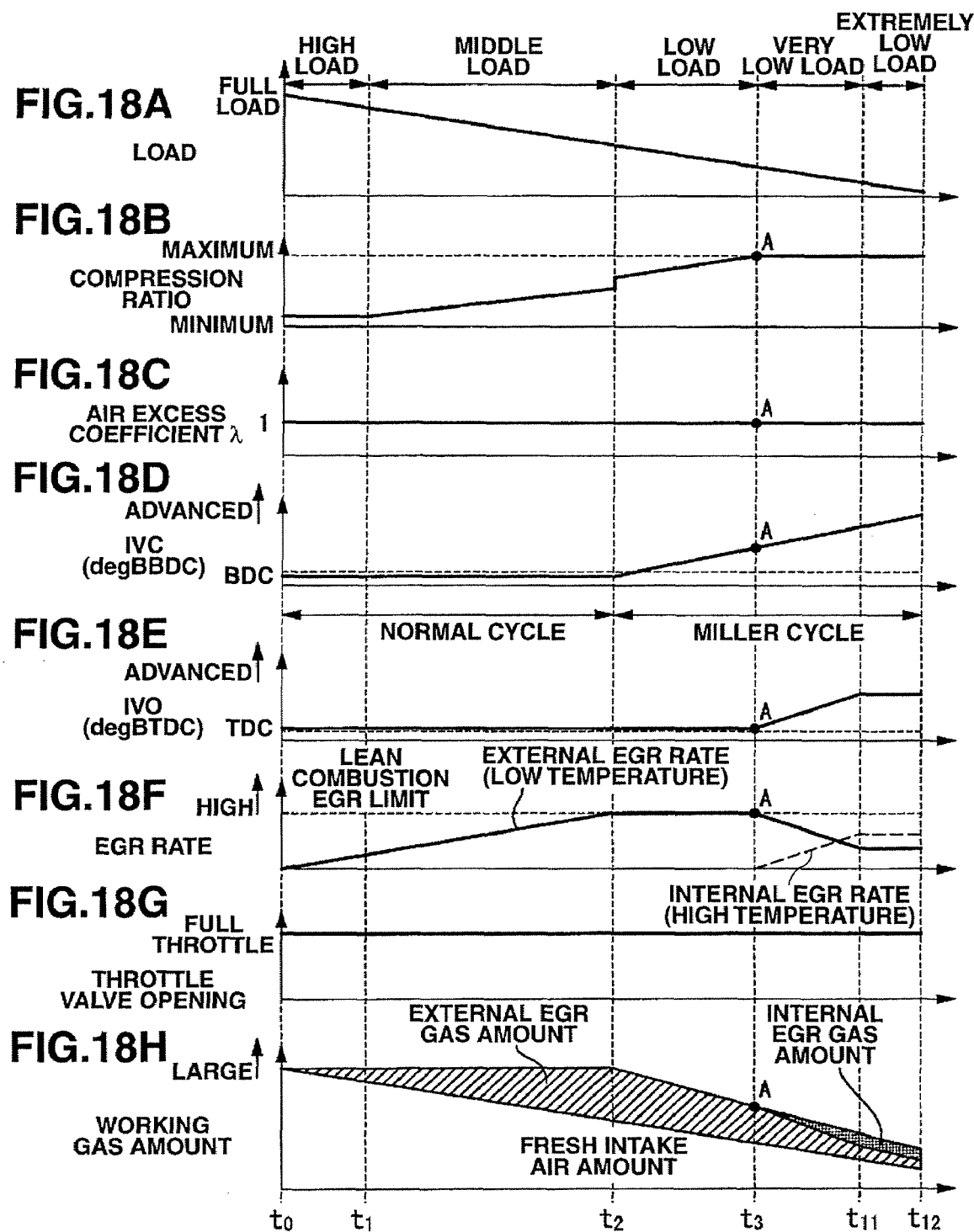
FIGS. 18A to 18H are time charts showing engine operations under the control of the NOx emission reduction apparatus according to the second embodiment of the present invention.

When the engine load shifts into the very-low-load operation range at time t3, controller 50 repeats steps S1, S2, S4, S6, S9 and S8 for the very-low-load operation control. When the engine load further shifts into the extremely-low-load operation range at time t11, controller 50 repeats steps S1, S2, 54, S6, S9 and S10 for the extremely-low-load operation control. The mechanical compression ratio is adjusted to the maximum degree (FIG. 18B, S101). The fuel is injected to adjust the air excess coefficient $\lambda$ to 1 (FIG. 18C, S102). Variable valve mechanism 200 is controlled to adjust the intake valve open timing IVO in such a manner as to attain the target internal EGR rate and to adjust the intake valve close timing IVC in accordance with the load (FIGS. 18D and 18E, S103) for miller cycle operations. The EGR valve opening is controlled to supply the external EGR gas in such a manner as to maintain the lean combustion EGR limit rate by the total of the external EGR rate and the internal EGR rate (FIG. 18F, S104). In one embodiment the EGR limit rate may be achieved by controlling the EGR valve to keep the EGR rate of the external EGR gas approximately constant, irrespective of change of the engine load, and control the variable valve mechanism to adjust either the intake valve open timing or the exhaust valve close timing to keep the EGR rate of the internal EGR gas approximately constant. In another embodiment, the EGR limit rate may be achieved by controlling the EGR valve to not recirculate the external EGR gas to the intake passage, control the throttle valve in such a manner as to decrease the fresh intake air amount as the engine load decreases, and control the variable valve mechanism to adjust either the intake valve open timing or the exhaust valve close timing to keep the EGR rate of the internal EGR gas approximately constant. The lean combustion EGR limit rate is maintained by the above procedure (FIG. 18H).

It is therefore possible according to the present embodiment to supply the maximum possible amount of EGR gas while maintaining the lean combustion EGR limit rate, without intake valve 81 interfering with piston 32, for stable engine operations and NOx emission reduction even under low-load, high-compression-ratio conditions.

Third Embodiment

Figure 19:
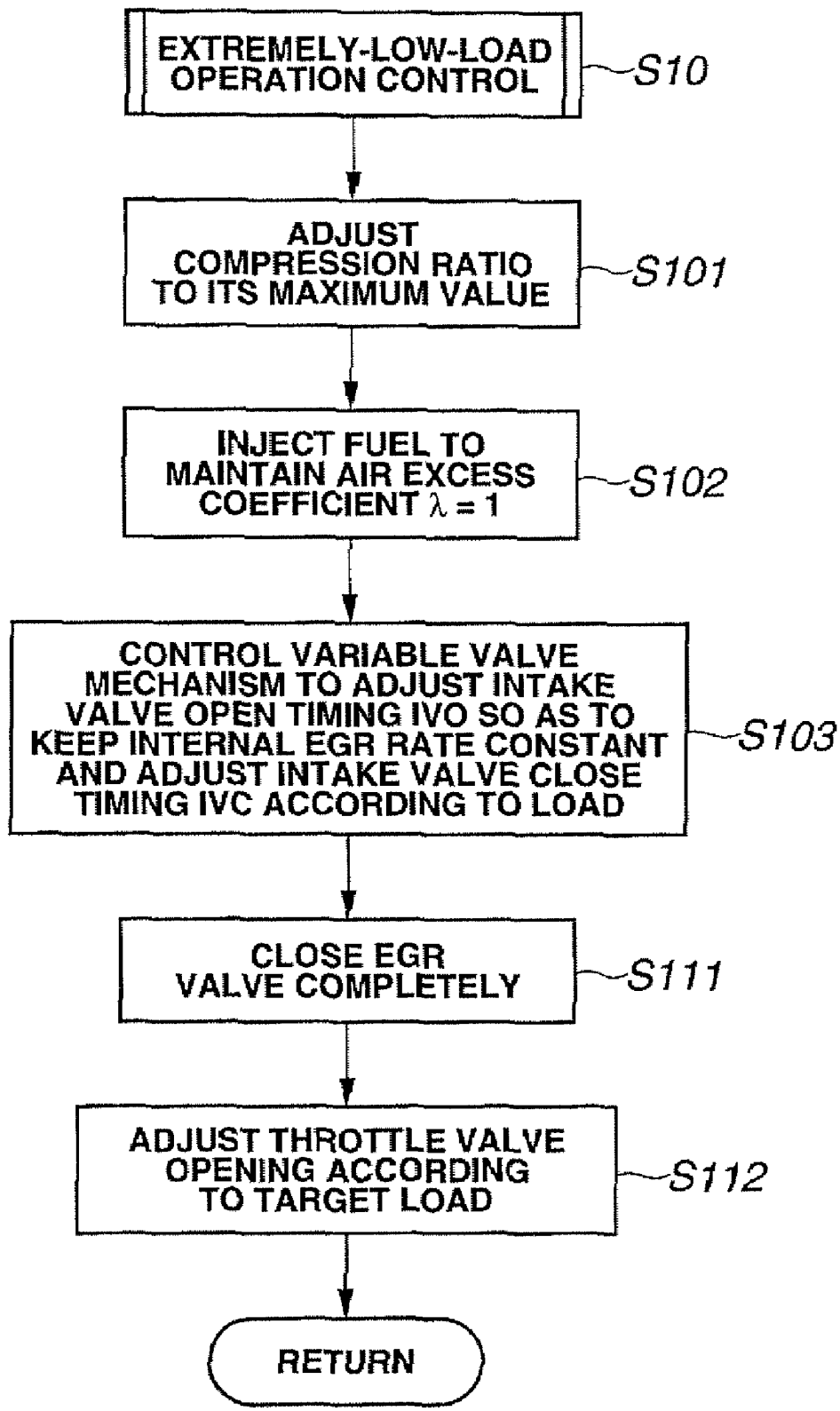
FIG. 19 is a flowchart for an extremely-low-load operation control routine of the NOx emission reduction apparatus according to a third embodiment of the present invention.

FIG. 19 is a flowchart for a routine program of the extremely-low-load operation control according to the third embodiment of the present invention.

In the second embodiment, the extremely-low-load operation control is performed by limiting the amount of advance of the intake valve open timing IVO so as to prevent intake valve 81 from interfering with piston 32 and by maintaining the ratio between the internal EGR rate and the external EGR rate constant. In the present embodiment, by contrast, the extremely-low-load operation control is performed by cutting the supply of EGR gas and by regulating the opening of throttle valve 62 to decrease the fresh intake air amount. The details of this control routine will be explained below with reference to FIG. 19. The main control routine of the present embodiment is the same as that of the second embodiment, except for the contents of the extremely-low-load operation control. An explanation will be thus given only to the extremely-low-load operation control of the present embodiment.

Controller 50 controls actuator 51 to maximize the mechanical compression ratio (step S101), controls fuel injection valve 63 to inject fuel in such a manner as to adjust the air excess coefficient to 1 (step S102), and then, controls variable valve mechanism 200 to set the intake valve open timing IVO in such a manner as to attain a target internal EGR rate, which has previously determined according to the load, and to adjust the intake valve close timing IVC according to the load (step S103). These control steps are the same as those of the second embodiment.

Controller 50 fully closes EGR valve 71a (step S111) and controls the opening of throttle valve 62 according to the load so as to adjust the fresh intake air amount (step S112). Controller 50 may be configured to store e.g. in the ROM a characteristic map experimentally set to determine the throttle valve opening in accordance with the load.

FIGS. 20A to 20H are time charts showing engine operations under the control of the NOx emission reduction apparatus according to the third embodiment of the present invention. The engine operations under the control of the NOx emission reduction apparatus during the period up to time t11 are the same in the second and third embodiments. An explanation of the engine operations during the period up to time t11 will be thus omitted.

Figure 20:
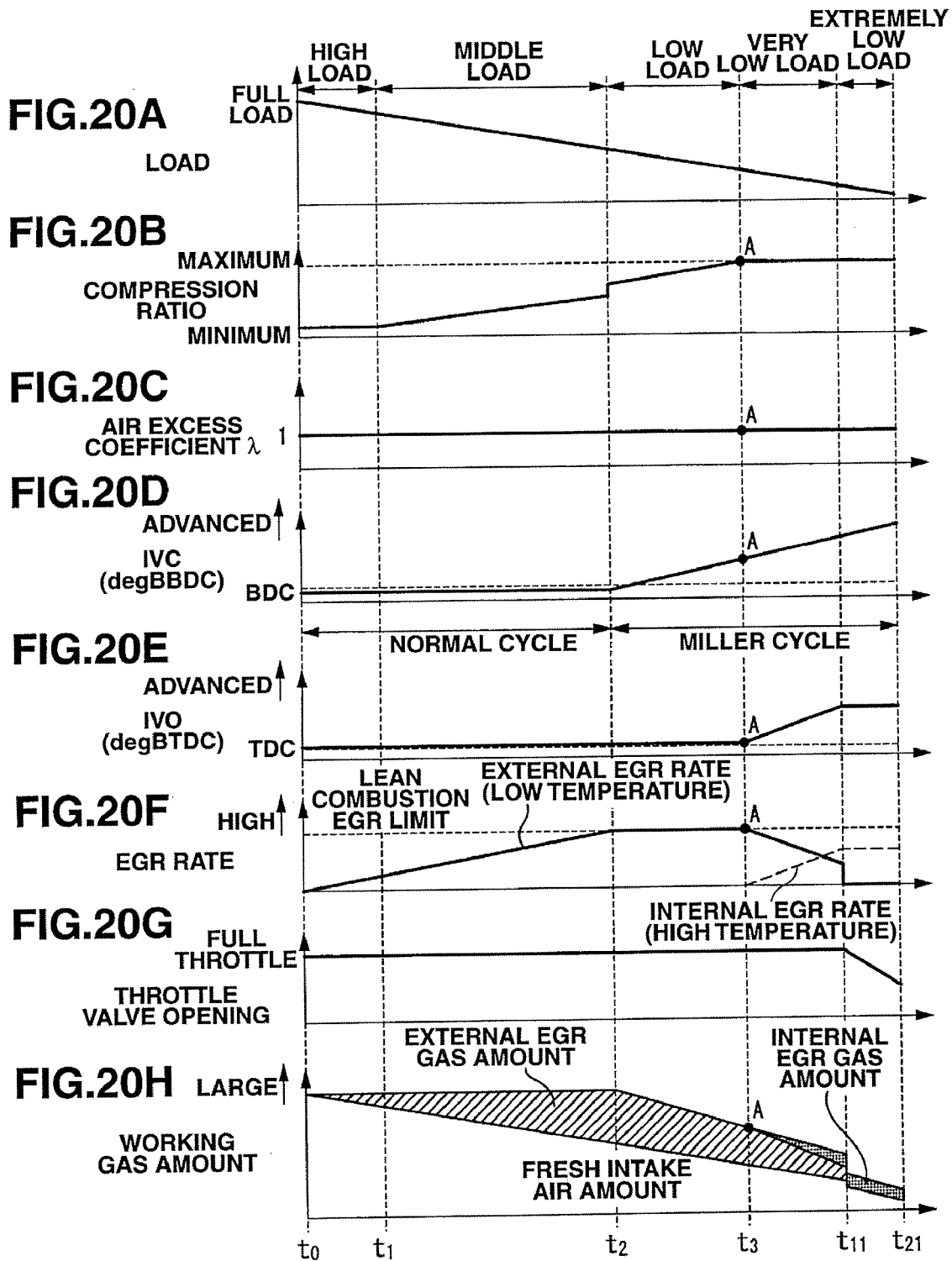
FIGS. 20A to 20H are time charts showing engine operations under the control of the NOx emission reduction apparatus according to the third embodiment of the present invention.

When the engine load shifts into the extremely-low-load operation range at time t11, controller 50 repeats steps S1, S2, S4, S6, S9 and S10 for the extremely-low-load operation control. The mechanical compression ratio is adjusted to the maximum value (FIG. 20B, S101). The fuel is injected to adjust the air excess coefficient $\lambda$ to 1 (FIG. 20C, S102). Variable valve mechanism 200 is controlled to adjust the intake valve open timing IVO in such a manner as to attain the target internal EGR rate and to adjust the intake valve close timing IVC in accordance with the load (FIGS. 20D and 20E, S103) for miller cycle operations. The EGR valve 71a is fully closed (FIG. 20F, S111). Then, the opening of throttle valve 62 is controlled in accordance with the load to adjust the fresh intake air amount (FIG. 20H, S112).

It is also possible according the present embodiment to supply the maximum possible amount of EGR gas while maintaining the lean combustion EGR limit rate, without intake valve 81 interfering with piston 32, for stable engine operations and NOx emission reduction even under low-load, high-compression-ratio conditions.

Fourth Embodiment

Figure 21:
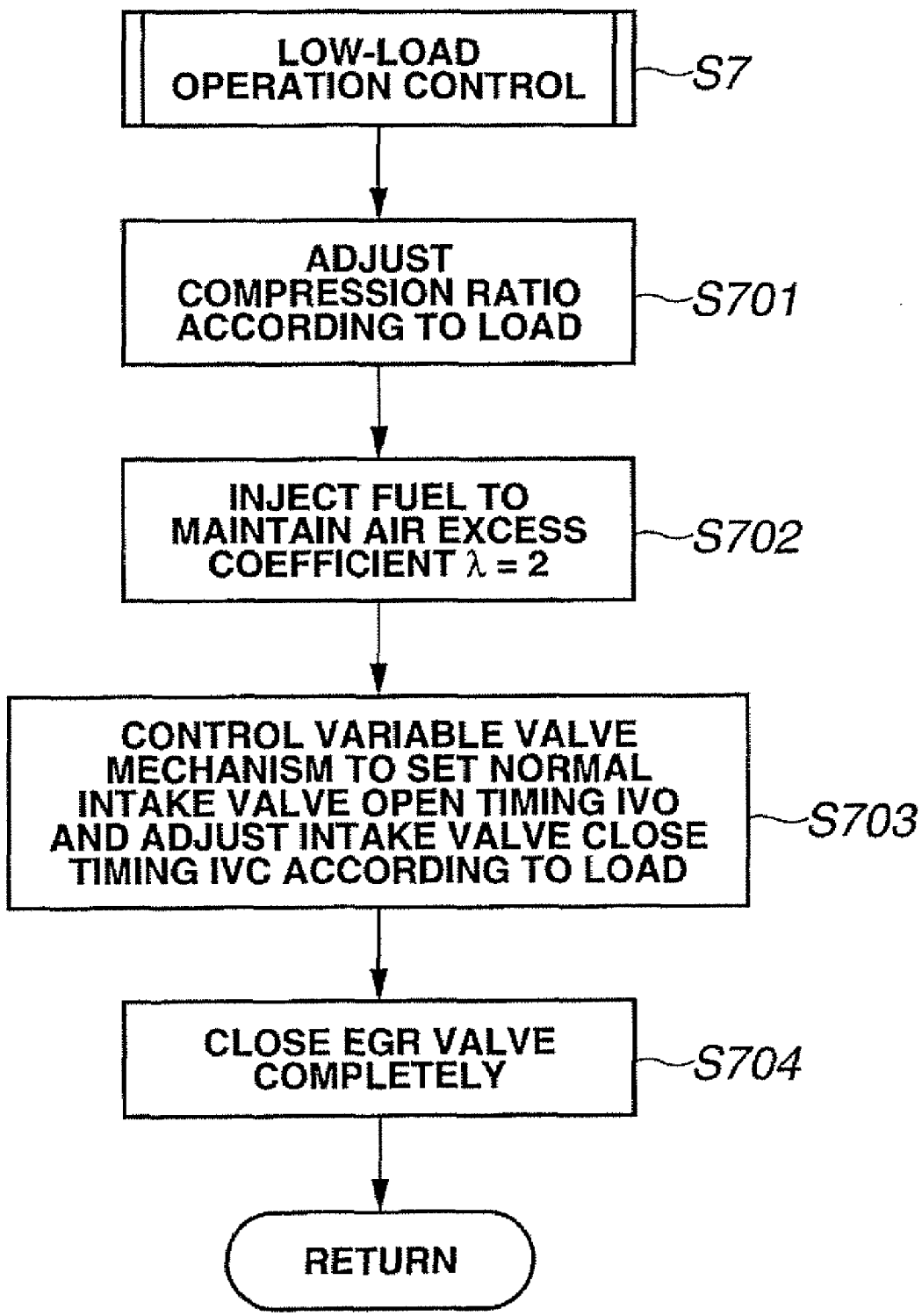
FIG. 21 is a flowchart for a low-load operation control routine of the NOx emission reduction apparatus according to a fourth embodiment of the present invention.

FIG. 21 is a flowchart for a routine program of the low-load operation control according to the fourth embodiment of the present invention.

In the above embodiments, the low-load operation control is performed by controlling the intake valve open and close timings IVO and IVC to allow miller cycle operations and by increasing the internal EGR rate, instead of increasing the external EGR rate, to maximize the total amount of EGR gas in the intake medium and thereby maintain the lean combustion EGR limit rate for NOx emission reduction.

As explained above with reference to FIG. 4B, double-link type variable compression ratio engine 10 has a relatively long piston top dead center duration. The stable combustion limit of engine 10 is thus unlikely to deteriorate so that it is possible to secure combustion stability by increasing the compression ratio (to e.g. about 1.8) even when the air-fuel ratio is about 30:1 (the air excess coefficient is about 2). There are almost no NOx emissions when the air-fuel ratio is greater than or equal to about 30 as shown in FIG. 4B. In view of these characteristics, the NOx emissions are prevented by controlling the air-fuel ratio to 30 or greater, rather than by supplying the EGR gas, in the low-load operation range.

Namely, the low-load operation control is performed by controlling fuel injection valve 63 to inject fuel in such a manner as to adjust the air excess coefficient $\lambda$ to 1 and controlling the opening of EGR valve 71a to maintain the lean combustion EGR limit rate in the first embodiment. In the present embodiment, by contrast, the low-load operation control is performed by cutting the supply of external EGR gas, increasing the mechanical compression ratio and adjusting the fuel injection amount to adjust the air excess coefficient $\lambda$ to 2 so as to allow ultra-lean combustion operations for NOx emission reduction.

The details of this control routine will be explained below with reference to FIG. 21. The main control routine of the present embodiment is the same as that of the first embodiment, except for the contents of the low-load operation control. An explanation will be thus given only to the low-load operation control of the present embodiment.

At step 701, controller 50 controls actuator 51 to adjust the mechanical compression ratio according to the load. Controller 50 may be configured to store e.g. in the ROM a characteristic map experimentally set to determine the mechanical compression ratio in accordance with the load. 49.] At step 702, controller 50 controls fuel injection valve 63 to inject fuel in such a manner as to adjust the air excess coefficient to 2.

At step S703, controller 50 controls variable valve mechanism 200 to set the intake valve open timing IVO normally and to adjust the intake valve close timing IVC according to the load. Controller 50 may be configured to store e.g. in the ROM a characteristic map experimentally set to determine the intake valve close timing IVC in accordance with the load.

At step S704, controller 50 fully closes EGR valve 71a.

FIGS. 22A to 22H are time charts showing engine operations under the control of the NOx emission reduction apparatus according to the fourth embodiment of the present invention. The engine operations under the control of the NOx emission reduction apparatus up to time t2 and from time t3 are the same in the first and fourth embodiments. An explanation of the engine operations up to time t2 and from time t3 will be thus omitted.

When the engine load shifts into the low-load operation range at time t2, controller 50 repeats steps S1, S2, S4, S6 and S7 for the low-load operation control according to the flowchart of FIG. 10. The mechanical compression ratio is adjusted in accordance with the load (FIG. 22B, S701). The fuel is injected to adjust the air excess coefficient λ to 2 (FIG. 22C, S702). Variable valve mechanism 200 is controlled to set the intake valve open timing IVO normally and to adjust the intake valve close timing IVC in accordance with the load (FIGS. 22D and 22E, S703) for miller cycle operations. The EGR valve 71a is fully closed (FIG. 22F, S704). It is possible by the above procedure to reduce NOx emissions in the low-load operation range.

[Modification 1 of Variable Compression Ratio Engine]

Figure 23A:
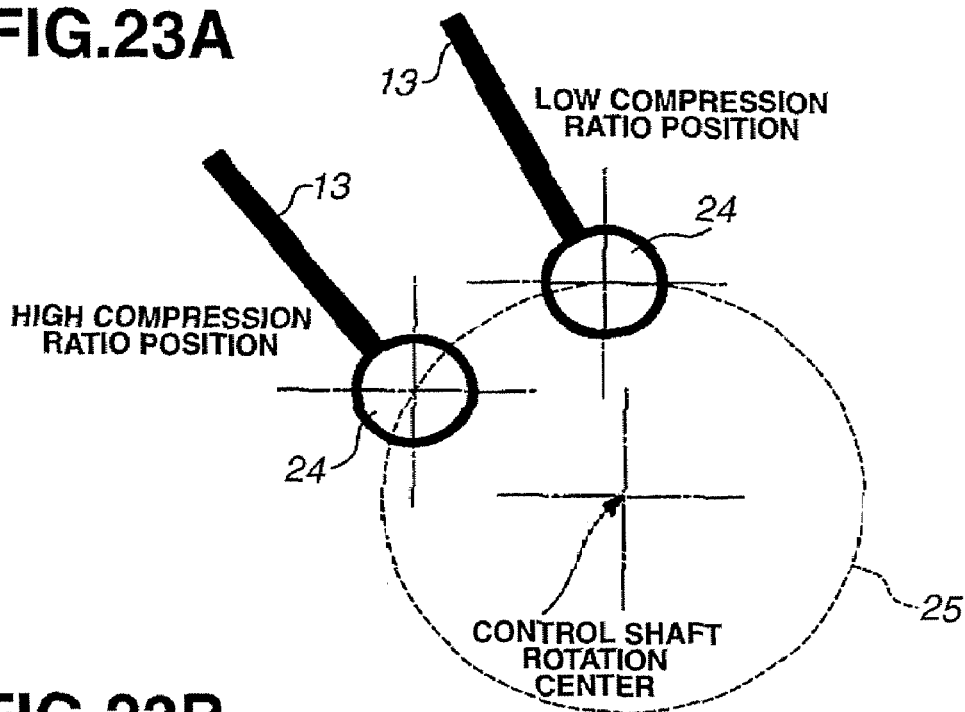
FIGS. 23A and 23B are schematic views of another example of variable compression ratio engine.
Figure 23B:
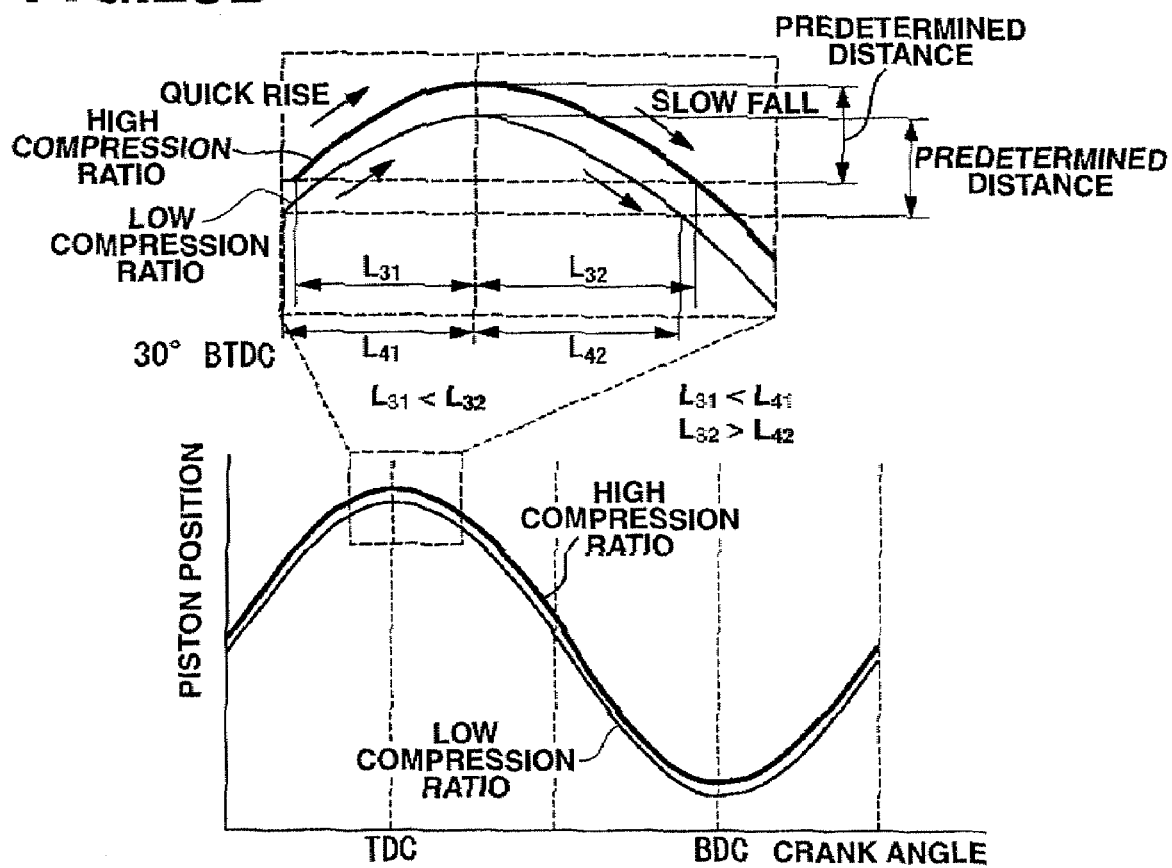

Variable compression ratio engine 10 may be modified as indicated in 23A and 23B. The compression ratio can be increased by the counterclockwise rotation of control shaft 25 as shown in FIGS. 23A and 23B although the compression ratio is increased by the clockwise rotation of control shaft 25 in the above embodiments. Further, the diameter of control shaft 25 and the distance from the center of control shaft 25 to connection pin 24 can be made large as shown in FIGS. 23A and 23B. These engine dimensions allow piston 32 to characteristically show extreme behavior at around the top dead center so that the rise speed of piston 32 becomes lower than the fall speed of piston 32, i.e., the degree of L31<L32 becomes increased.

As the compression ratio is increased as control shaft 23 rotates in the counterclockwise direction, the piston rise speed increases with the compression ratio, i.e. L31<L41, and the piston fall speed decreases with increase in the compression ratio, i.e., L32>L42.

Thus, the piston rise speed is so high that the time for piston 32 to reach the top dead center is short in the high-compression ratio state. This makes it possible to prevent the occurrence of pre-ignition (self ignition). Further, the piston fall speed is low that the piston top dead center duration is long. This makes it possible to secure combustion stability.

On the other hand, the piston fall speed is relatively high in the low-compression-ratio state. This makes it possible to prevent the occurrence of knocking in the later stage of combustion.

[Modification 2 of Variable Compression Ratio Engine]

Figure 24A:
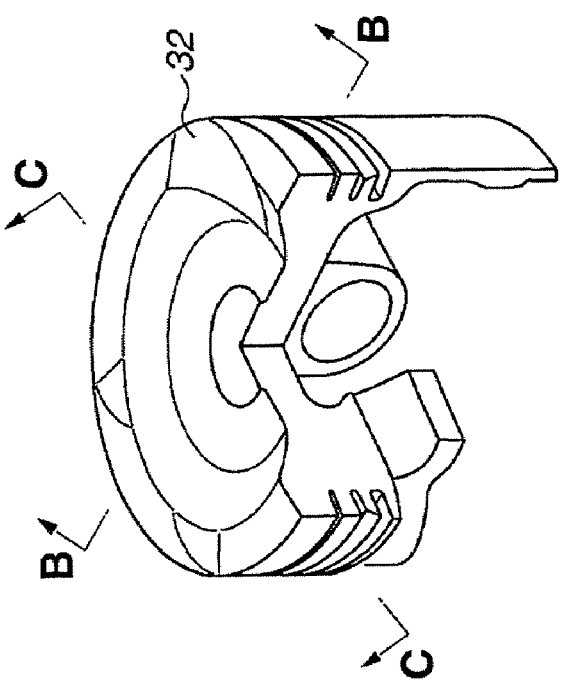
FIGS. 24A, 24B and 24C are schematic views of still another example of variable compression ratio engine.
Figure 24B:
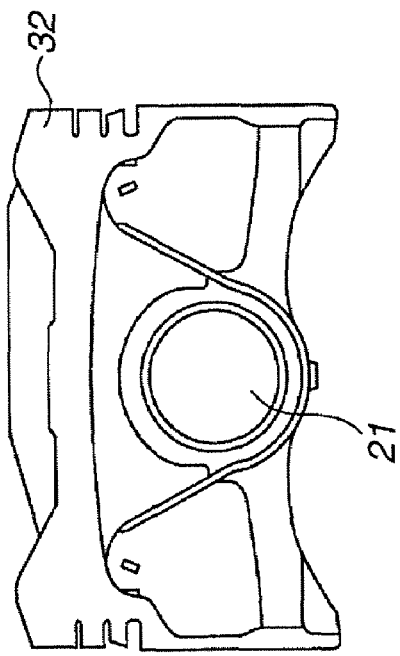
Figure 24C:
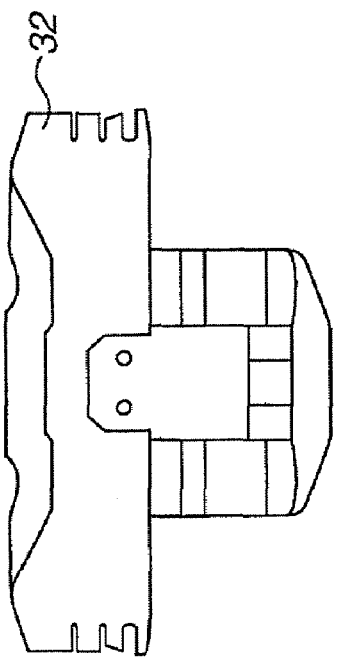

Variable compression ratio engine 10 may utilize piston 32 shown in FIGS. 24A to 24C. FIG. 24A is a perspective view of piston 32, FIG. 24B is a sectional view of piston 32 when cut along a line B-B of FIG. 24A, FIG. 24C is a sectional view of piston 32 when cut along a line C-C of FIG. 24A and FIGS. 25A and 25B are diagrams showing piston behavior As shown in FIG. 24C, piston 32 has its piston skirt shortened substantially.

By the use of this piston 32, counterweight 33c is allowed to pass through the lateral side of piston pin 21. This makes it possible to increase the piston stroke by minimizing the length of upper link 11 and bringing the bottom dead center of piston 32 closest to crankshaft 33. Herein, the strength of the piston skirt is one of challenges to adopt this engine configuration. However, the characteristics of double-link mechanism can be utilized such that upper link 11 substantially stands upright as shown in FIG. 25B at the top dead center of piston 32 so as to reduce the lateral load (thrust load) on piston 32 and thereby secure the piston skirt strength.

Although the present invention has been described with reference to the above specific embodiments, the invention is not limited to these embodiments. Various modifications and variations of the embodiments described above will occur to those skilled in the art in light of the above teaching.

For example, the low-load operation control of the fourth embodiment and the extremely-low-load operation control of the second or third embodiment may be applied in combination.

The internal EGR gas amount can be adjusted by controlling variable valve mechanism to vary the exhaust valve close timing and trap combustion gas in cylinder 31a using the valve mechanism 200 although it is adjusted by controlling variable valve mechanism 200 to vary the intake valve open timing in the above embodiments. In some embodiments, the controller 50 adjusts the internal EGR gas by changing an overlap between intake and exhaust gas valve opening periods. In other embodiments, the controller 50 advances an exhaust value close timing to adjust the amount of combustion gas trapped in the cylinder and supplied as the internal EGR gas.

A specific embodiment of method and apparatus for reducing NOx emission has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A NOx emission reduction apparatus of an engine, comprising:
   an EGR valve disposed in an EGR passage for communication between an intake passage and an exhaust passage so as to adjust an amount of an external EGR gas recirculated from the exhaust passage to the intake passage;

a variable valve mechanism capable of varying either an intake valve open timing or an exhaust valve close timing of the engine so as to adjust an amount of an internal EGR gas returned from the cylinder to an intake port of the engine and resupplied into the cylinder; and a controller programmed to:

detect an engine load of the engine; and when the detected engine load is in a very-low-load operation range, control the EGR valve to decrease an EGR rate of the external EGR gas as the engine load decreases and control the variable valve mechanism to adjust either the intake valve open timing or the exhaust valve close timing to increase an EGR rate of the internal EGR gas as the engine load decreases.

2. The NOx emission reduction apparatus of the engine as recited in claim 1, wherein the controller is programmed to control the variable valve mechanism to advance the intake valve open timing as the engine load decreases.

3. The NOx emission reduction apparatus of the engine as recited in claim 1, wherein: the variable valve mechanism is capable of varying an intake valve close timing of the engine so as to adjust an amount of fresh intake air introduced into the cylinder; and the controller is programmed to control the variable valve mechanism to advance the intake valve close timing as the engine load decreases.

4. The NOx emission reduction apparatus of the engine as recited in claim 1, further comprising: a variable compression ratio mechanism that varies a mechanical compression ratio of the engine, wherein the controller is programmed to, when the detected engine load is in a low-load operation range higher in load than the very-low-load operation range, control the variable compression ratio mechanism to increase the mechanical compression ratio as the engine load decreases.

5. The NOx emission reduction apparatus of the engine as recited in claim 4, wherein the controller is programmed to control the EGR valve to maintain the EGR rate of the external EGR gas at a lean combustion EGR limit rate.

6. The NOx emission reduction apparatus of the engine as recited in claim 4, further comprising: a fuel injection valve to inject fuel, wherein the controller is programmed to control the EGR valve to not recirculate the external EGR gas to the intake passage and control the fuel injection valve to inject fuel to attain a lean air-fuel ratio with respect to the stoichiometric air-fuel ratio.

7. The NOx emission reduction apparatus of the engine as recited in claim 4, wherein the controller is programmed to, when the detected engine load is in the low-load operation range, controls the variable valve mechanism to advance an intake valve close timing of the engine as the engine load decreases.

8. The NOx emission reduction apparatus of the engine as recited in claim 4, wherein the controller is programmed to, when the detected engine load is in a middle-load operation range higher in load than the low-load operation range, control the variable compression ratio mechanism to increase the mechanical compression ratio as the engine load decreases and control the EGR valve to increase the EGR rate of the external EGR gas as the engine load decreases.

9. The NOx emission reduction apparatus of the engine as recited in claim 1, wherein the controller is programmed to, when the detected engine load is in an extremely-low-load operation range lower in load than the very-low-load operation range, control the EGR valve to keep the EGR rate of the external EGR gas approximately constant, irrespective of change of the engine load, and control the variable valve mechanism to adjust either the intake valve open timing or the exhaust valve close timing to keep the EGR rate of the internal EGR gas approximately constant.

10. The NOx emission reduction apparatus of the engine as recited in claim 1, further comprising: a throttle valve to adjust an amount of fresh intake air introduced into the cylinder, wherein the controller is programmed to, when the detected engine load is in an extremely-low-load operation range lower in load than the very-low-load operation range, control the EGR valve to not recirculate the external EGR gas to the intake passage, control the throttle valve in such a manner as to decrease the fresh intake air amount as the engine load decreases, and control the variable valve mechanism to adjust either the intake valve open timing or the exhaust valve close timing to keep the EGR rate of the internal EGR gas approximately constant.

11. The NOx emission reduction apparatus of the engine as recited in claim 1, wherein the variable valve mechanism changes an overlap between intake and exhaust valve opening periods to adjust the amount of the internal EGR gas.

12. The NOx emission reduction apparatus of the engine as recited in claim 1, wherein the variable valve mechanism advances an exhaust valve close timing of the engine to adjust the amount of the combustion gas enclosed in the cylinder as the internal EGR gas.

13. The NOx emission reduction apparatus of the engine as recited in claim 4, wherein the variable compression mechanism comprises: a first link connected to a piston of the engine; a second link rotatably mounted on a crank pin of a crankshaft of the engine and connected to the first link; and a third link to control a movement of the second link so as to adjust the mechanical compression ratio.

14. A NOx emission reduction method for an engine, the engine having an EGR valve disposed in an EGR passage for communication between an intake passage and an exhaust passage so as to adjust an amount of an external EGR gas recirculated from the exhaust passage to the intake passage and a variable valve mechanism capable of varying either one of intake valve open timing and exhaust valve close timing so as to adjust an amount of an internal EGR gas returned from the cylinder to an intake port of the engine and resupplied into the cylinder, the NOx emission reduction method comprising:

detecting an engine load of the engine; and when the detected engine load is in a very-low-load operation range, controlling the EGR valve to decrease an EGR rate of the external EGR gas as the engine load decreases and controlling the variable valve mechanism to adjust either the intake valve open timing or the exhaust valve close timing to increase an EGR rate of the internal EGR gas as the engine load decreases.

15. The NOx emission reduction method for the engine as recited in claim 14, wherein the step of controlling the variable valve mechanism further comprises setting the intake valve open timing or the exhaust valve close timing to a predetermined value based upon the detected engine load.

16. The NOx emission reduction method for the engine as recited in claim 14, further comprising increasing a compression ratio as the engine load decreases.

17. The NOx emission reduction method for the engine as recited in claim 16, wherein the step of increasing the compression ratio further comprises setting the compression ratio to a predetermined value based upon the detected engine load.

18. A NOx emission reduction apparatus of an engine, comprising:
high-temperature EGR gas supply means for supplying a high-temperature EGR gas into a cylinder of the engine;
low-temperature EGR gas supply means for supplying a low-temperature EGR gas into the cylinder;
means for detecting a load of the engine; and
means for, when the detected engine load is in a very-low-load operation range, controlling the low-temperature EGR gas supply means to decrease an EGR rate of the low-temperature EGR gas as the engine load decreases and controlling the high-temperature EGR gas supply means to increase an EGR rate of the high-temperature EGR gas as the engine load decreases.

19. The NOx emission reduction apparatus of the engine as in claim 18 wherein, the means for controlling the high-temperature EGR gas supply further comprises a variable valve mechanism.

20. The NOx emission reduction apparatus of the engine as in claim 19, wherein the variable valve mechanism further comprises either an intake vale opening timing or an exhaust valve close timing.

* * * * *